(12) United States Patent
Hansen et al.

(10) Patent No.: US 9,135,576 B2
(45) Date of Patent: Sep. 15, 2015

(54) SYSTEM FOR AND METHOD OF GENERATING AND VISUALIZING SHARING EVENT CASCADE STRUCTURES ASSOCIATED WITH CONTENT SHARING EVENTS THAT OCCUR ACROSS A NETWORK

(75) Inventors: Mark H. Hansen, West Hollywood, CA (US); Jeremy Thorp, Brooklyn, NY (US)

(73) Assignee: The New York Times Company, New York, NY (US)

( * ) Notice: Subject to any disclaimer, the term of this patent is extended or adjusted under 35 U.S.C. 154(b) by 1135 days.

(21) Appl. No.: 13/083,049

(22) Filed: Apr. 8, 2011

(65) Prior Publication Data

US 2012/0260182 A1    Oct. 11, 2012

(51) Int. Cl.
*G06F 3/00* (2006.01)
*G06Q 10/00* (2012.01)

(52) U.S. Cl.
CPC ...................................... *G06Q 10/00* (2013.01)

(58) Field of Classification Search
USPC .......................................... 715/735, 738, 751
See application file for complete search history.

(56) References Cited

U.S. PATENT DOCUMENTS

| 6,594,673 | B1 * | 7/2003 | Smith et al. | 1/1 |
| 8,700,618 | B2 * | 4/2014 | Evans et al. | 707/726 |

* cited by examiner

*Primary Examiner* — Thanh Vu
(74) *Attorney, Agent, or Firm* — Rothwell, Figg, Ernst & Manbeck, P.C.

(57) ABSTRACT

A system for and method of generating and visualizing one or more sharing event cascade structures associated with one or more content sharing events that occur across a network may include generating a plurality of sharing event nodes in the one or more sharing event cascade structures based on data associated with at least one of a system log and a database, wherein each sharing event cascade structure graphically represents a history of one or more content items being shared among a plurality of users of the network, and presenting, on a display device, a content sharing visualization diagram that illustrates the one or more sharing event cascade structures and enables a user to analyze sharing patterns associated with the plurality of users of the network.

22 Claims, 30 Drawing Sheets

| Source | Information | Match Keys |
|---|---|---|
| Web Server Logs | Content Items Browsed By URL | User IP, Cookie, Date/Time, Location (Derived) |
| URL Indexer | Content Item URLs Indexed | User IP, Date/Time, URL Hash, Location (Derived) |
| Sharing Point | Content Sharing Events With Content Items URLs Referenced | Date/Time, URL Hash, Location (Profile) |

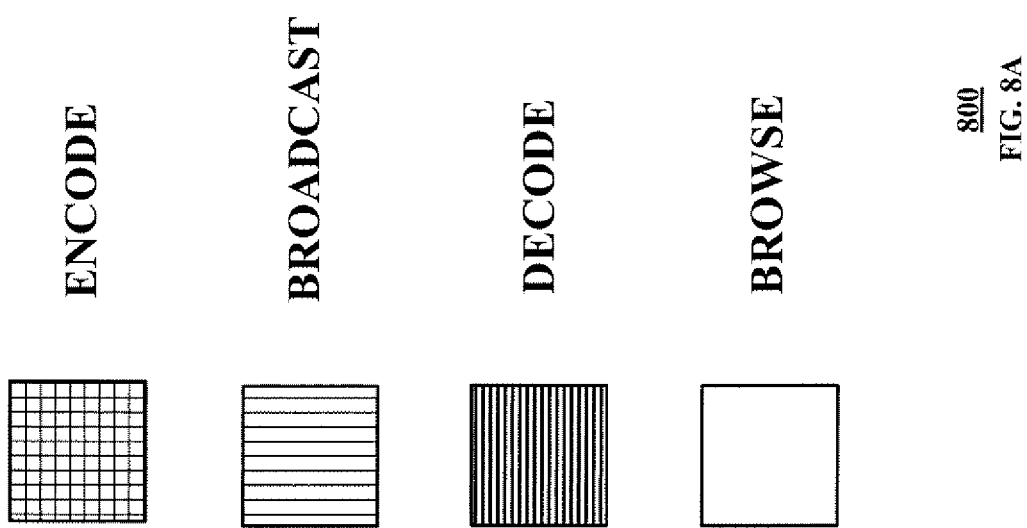

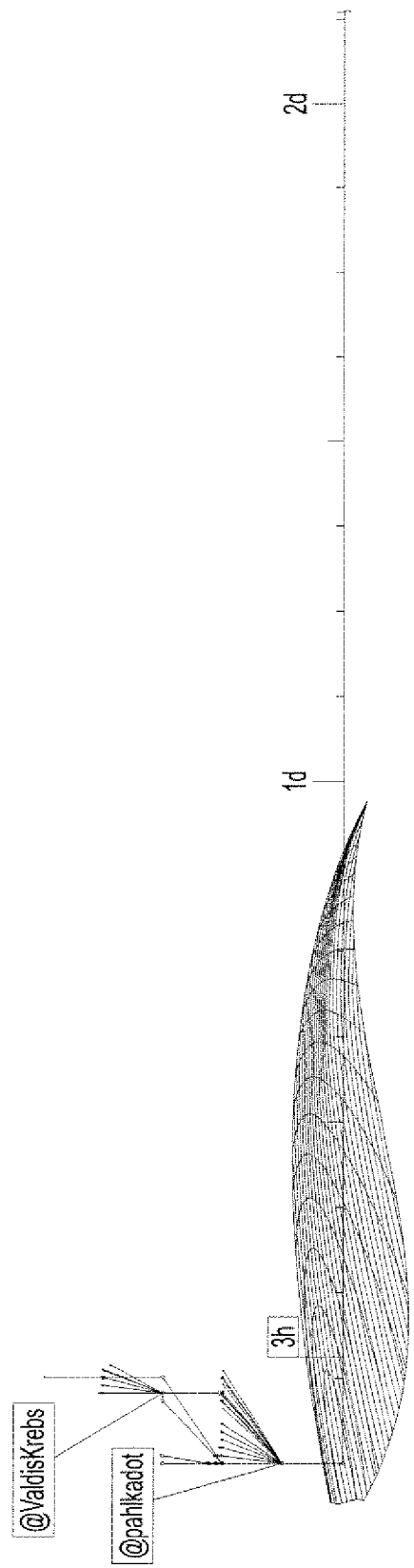

SYSTEM FOR AND METHOD OF GENERATING AND VISUALIZING SHARING EVENT CASCADE STRUCTURES ASSOCIATED WITH CONTENT SHARING EVENTS THAT OCCUR ACROSS A NETWORK

FIELD OF THE INVENTION

The present invention relates to content sharing events, generally, and a system for and method of generating sharing event cascade structures associated with content sharing events that occur across a network, in particular.

BACKGROUND INFORMATION

Social networking tools have become popular among Internet users in recent years. Many content providers and marketers may consider social networks to be significant distribution resources for sharing electronic content among Internet users. Accordingly, these content providers and marketers may desire to learn new and better ways to leverage the distribution of electronic content through social networking tools (or through social networks).

BRIEF DESCRIPTION OF THE DRAWINGS

Purposes and scope of exemplary embodiments described below will be apparent from the following detailed description in conjunction with the appended drawings in which like reference characters are used to indicate like elements, and in which:

FIG. 7 illustrates an example table containing data resources for constructing sharing event cascade structures according to an embodiment of the invention;

FIG. 8A illustrates an example diagram of a sharing event cascade structure key according to an embodiment of the invention;

FIG. 10B illustrates an example sharing visualization diagram depicting the transition from a network display to a time-based histogram according to an embodiment of the invention;

SUMMARY OF EMBODIMENTS OF THE INVENTION

Figure 1:
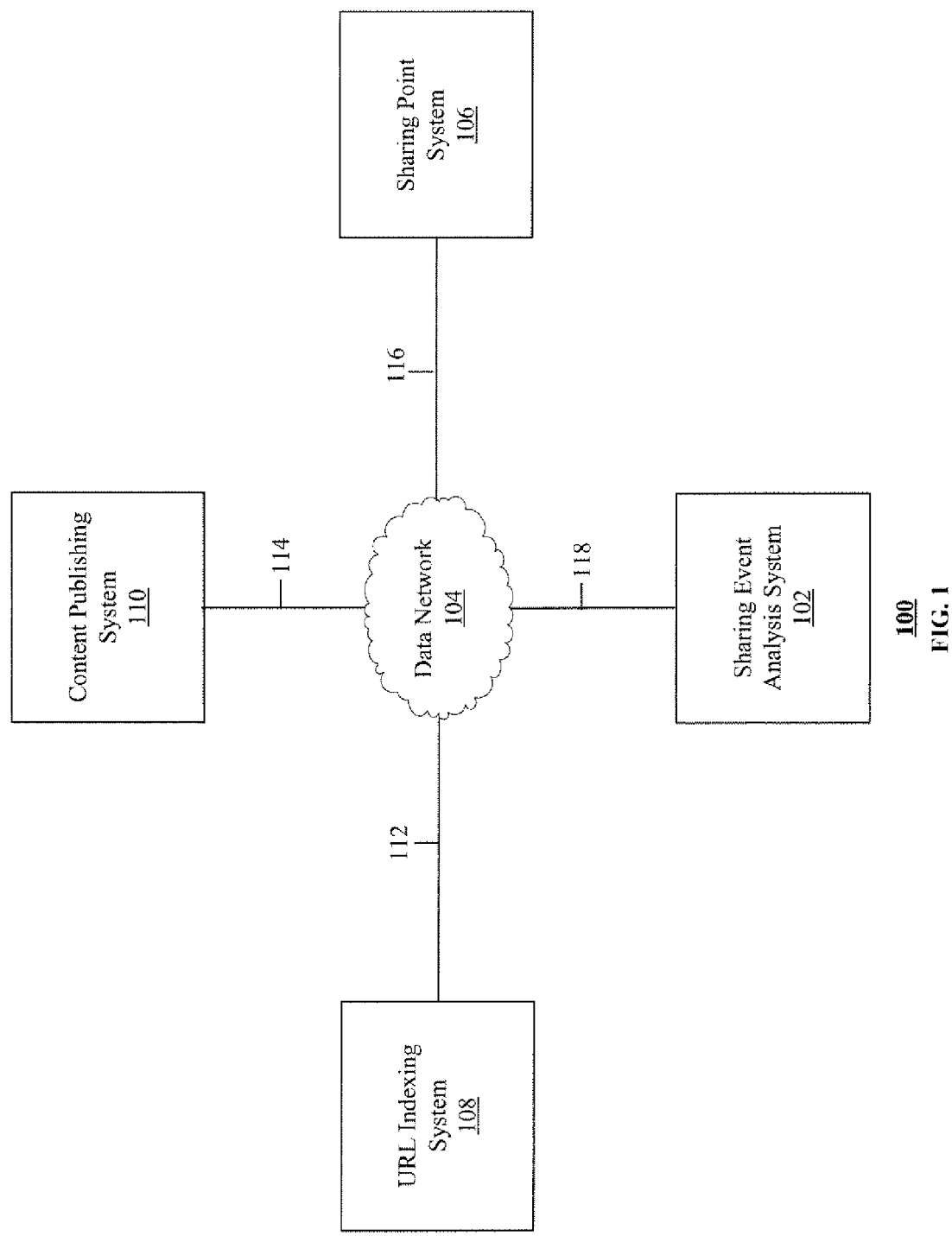
FIG. 1 illustrates a block diagram of a sharing analysis system according to an embodiment of the invention.

At least one exemplary embodiment may provide a method of generating and visualizing one or more sharing event cascade structures associated with one or more content sharing events that occur across a network. This embodiment may include generating a plurality of sharing event nodes in the one or more sharing event cascade structures based on data associated with at least one of a system log and a database. Each sharing event cascade structure may graphically represent a history of one or more content items being shared among a plurality of users of the network. This embodiment may also include presenting, on a display device, a content sharing visualization diagram that illustrates the one or more sharing event cascade structures and enables a user to analyze sharing patterns associated with the plurality of users of the network.

Another exemplary embodiment according to this invention may provide a system for generating and visualizing one or more sharing event cascade structures associated with one or more content sharing events that occur across a network. This embodiment may include a programmed computing apparatus configured to generate a plurality of sharing event nodes in the one or more sharing event cascade structures based on data associated with at least one of a system log and a database. Each sharing event cascade structure may graphically represent a history of one or more content items being shared among a plurality of users of the network. This embodiment may also include a programmed computing apparatus configured to present, on a display device, a content sharing visualization diagram that illustrates the one or more sharing event cascade structures and enables a user to analyze sharing patterns associated with the plurality of users of the network.

DETAILED DESCRIPTION OF EMBODIMENTS OF THE INVENTION

A user of a social networking tool may share a uniform resource locator (URL) of a content item (e.g., electronic content, digitally published newspaper articles, digitally published magazine articles, electronic books) digitally published on a website (e.g., www.nytimes.com, www.about.com) with other users of a social network through a series of one or more content sharing events (e.g., one or more broadcasts, one or more tweets, one or more mails). In such instances, the user may broadcast the URL of the content item to multiple users (e.g., users of the social network) who then access the content item (e.g., the webpage displaying the content item) by activating (e.g., clicking on, accessing, downloading) the shared URL of the content item. At least some of the multiple users may then share the URL of the content item with additional users (e.g., users of a social network) by initiating one or more additional content sharing events. Accordingly, a single content sharing event may have significant broadcast effects that cause a content item to be shared among a substantial number of users (e.g., users of a social network).

Content providers (e.g., the publishers of any electronic content) and marketers may desire to analyze sharing patterns associated with such content sharing events. For example, the publishers of www.nytimes.com may desire to analyze how a URL of a New York Times news article was shared among (e.g., broadcasted and rebroadcasted to, tweeted and retweeted to) a large group of Twitter users (e.g., users of www.twitter.com) beginning from a particular point-in-time. The publishers may be particularly interested in understanding how sharing this URL affects accesses (e.g., content being viewed or downloaded) to this story as well as other electronic content available from the New York Times (e.g., the New York Times website). In another example, the publishers of www.nytimes.com may desire to analyze aggregates of content sharing events involving URLs of different New York Times news articles to examine any, or a combination, of relationships between users, the content of the articles being shared, and one or more characteristics associated with the content sharing events (e.g., timing, wording). As a result of analyzing sharing patterns, the content providers and marketers may create strategies for increasing user participation in and activity around content sharing.

A sharing event cascade structure may be a detailed view of sharing activity attributable to one or more users. Each sharing event cascade structure may include several linked sharing event nodes. Each type of sharing event node may correspond to a particular type of action taken by a user while sharing content (e.g., browsing, encoding, broadcasting, decoding). Furthermore, these actions may involve services offered by one or more systems. For example, a content publishing system (e.g., one or more web servers associated with www.nytimes.com) records a user's browsing activity (e.g., content downloads), a URL indexing system (e.g., the system associated with the URL shortening service offered by bit.ly) prepares or encodes URLs for easy sharing, and a sharing point system (e.g., a social network, an electronic address book, a list of email subscribers) provides a distribution channel for sharing URLs.

The sharing event cascade structure may link sharing event nodes in a "causal" fashion (e.g., some links may be estimated). For example, the browsing activity of a first user of the content publishing system may lead the first user to encode one or more URLs that they, in turn, share on a social network. This action may lead a second user of the social network to activate and decode a shared URL, download the associated content, and then re-share the content with one or more other users of the social network (e.g., friends of the second user on the social network). After downloading the shared content, the second user may also browse more content published via the content publishing system. Accordingly, a sharing analysis system may access and analyze data from various systems (e.g., a content publishing system, a URL indexing system, a sharing point system) to create a sharing event cascade structure that illustrates a cascade of events that are linked "causally" in time.

A sharing analysis system may build and output sharing event cascade structures based on data accessed from any, or a combination, of a content publishing system, a URL indexing system, and a sharing point system. Each sharing event cascade structure may include one or more sharing event nodes (e.g., one or more browse nodes, one or more encode/indexing nodes, one or more broadcast nodes, one or more decode/de-indexing nodes) generated based on the data accessed from one or more of these systems. Data associated with each sharing event node may be analyzed and processed to form links and assemble the sharing event nodes into a tree structure (e.g., a sharing event cascade structure).

A sharing analysis system may also output (e.g., summarize or display) a content sharing visualization diagram that allows for the detailed analysis of sharing patterns associated with one or more content sharing events (e.g., one or more broadcasts, one or more tweets, one or more emails). That is, a content sharing visualization diagram may graphically illustrate any, or a combination, of one or more sharing event cascade structures, a relationship between one or more sharing event cascade structures over time, and relationships between users involved in sharing content items.

In one embodiment, the sharing analysis system may generate links between browse nodes (e.g., points in a sharing event cascade structure that indicate a content item published on a website has been downloaded by a user) and one or more encode nodes (e.g., points in a sharing event cascade structure that indicate that a URL of a content item published on a website has been indexed, for example "shortened," in response to input from a user) that are attributed to a particular user. Accordingly, the sharing analysis system may consult the content publishing system to locate and access browsing data associated with one or more users. Browsing data stored by the content publishing system may include any data that indicates a characteristic associated with a user browsing one or more content items. A web server, for example, routinely records the URL of a content item viewed by a user, the Internet Protocol (IP) address of a client device a user used to download the content item, the date and time of the download, and one or more cookies. In addition, the sharing analysis system may consult a URL indexing system to locate and access encode data associated with one or more indexed URLs. Encode data may include any data that indicates a characteristic associated with the encoding or indexing of a URL. For example, encode data may include any, or a combination, of data that indicates the full version of a URL associated with an indexed URL, data that indicates the index provided by the indexing service (e.g., a shortened version of a URL, a URL hash, an encoded version of a URL), data that indicates the IP address associated with the client device of a user that initiated the indexing (or encoding), data that indicates the date an indexed URL was created, and data that indicates the time an indexed URL was created. The sharing analysis system may then use the located browsing data and encode data to link browsing activity and the encoding of URLs to produce one kind of branch in a sharing event cascade structure.

The sharing analysis system may also generate links between encode nodes and one or more broadcast nodes (e.g., points in a sharing event cascade structure that indicate that an indexed URL associated with a content item published on a website has been shared or broadcasted on a social network in response to input from a user) of a sharing event cascade structure by accessing data associated with (e.g., stored in, generated by) a sharing point system (e.g., a system associated with www.twitter.com), a URL indexing system, or a combination of both. Such a link may imply that actions of a single user are responsible for encoding and broadcasting an indexed URL.

To generate such a link, the sharing analysis system may compare broadcast data stored in the sharing point system to encode data stored in the URL indexing system. Broadcast data may include any data that indicates a characteristic associated with the broadcasting of an indexed URL. For example, broadcast data may include any, or a combination, of data that indicates an indexed URL (e.g., a shortened URL, an encoded URL, a URL hash) broadcasted, data that indicates a user profile associated with a user that broadcasted an indexed URL, data that indicates the date an indexed URL was broadcasted, data that indicates the time an indexed URL was broadcasted, data that indicates an IP address of a client device of a user that initiated a broadcast, data that indicates whether a broadcast is a rebroadcast of another broadcast event, and data that indicates the users (user profiles) to which an indexed URL has been broadcasted. Based on a comparison of the broadcast data located in the sharing point system to the encode data located in the URL indexing system, the sharing analysis system may link one or more broadcast nodes for each indexed URL broadcasted to further build a sharing event cascade structure.

The sharing analysis system may also generate links between browse nodes and decode nodes (e.g., points in a sharing event cascade structure that indicate that an indexed URL associated with a content item published on a website has been activated or decoded by a user) of a sharing event cascade structure by accessing data associated with (e.g., stored in, generated by) a URL indexing system, a content publishing system, or a combination of both. Accordingly, the sharing analysis system may access the URL indexing system, the content publishing system, or a combination of both, to determine which, if any, indexed URLs associated with content items digitally published via the content publishing system have been activated by one or more users (e.g., users of the sharing point system, users of a social network, email users, Internet users) and subsequently downloaded by the same users.

To generate such a link, the sharing analysis system may compare decode data associated with one or more indexed URLs stored in the URL indexing system to browsing data stored in the content publishing system. Decode data may include any data that indicates a characteristic associated with activating and decoding an indexed URL. For example, decode data may include any, or a combination, of data that indicates an indexed URL (e.g., a shortened URL, an encoded URL, a URL hash) that has been activated and decoded, data that indicates an IP address associated with a client device of a user that initiated the activation and decoding, data that indicates client software used by a client device of a user that initiated the activation and decoding, data that indicates the date an indexed URL was activated and decoded, and data that indicates the time an indexed URL was activated and decoded. Based on a comparison of the decode data located in the URL indexing system to the browsing data located in the content publishing system, the sharing analysis system may link one or more decode nodes for one or more indexed URLs activated with one or more browse nodes (e.g., associated with corresponding browsing activity).

The sharing analysis system may also generate or form links between broadcast nodes that indicate a rebroadcast. Such links may be generated based on broadcast data and data that indicates the relationships between users of the sharing point system (e.g., friends of a user, followers of a user). In one embodiment, such links may be directly generated based on an indication of one or more broadcasts and one or more rebroadcasts in corresponding broadcast data. In another embodiment, such links may be indirectly generated based on any, or a combination, of data associated with a URL of a content item shared, data associated with a shared content item, and broadcast data associated with one or more broadcasts previously initiated by a user of the sharing point system to infer a logical rebroadcast (e.g., when a second user of a social network shares a content item that was previously shared with the second user by a first user of the social network). Accordingly, such direct links and indirect links associated with rebroadcasts may be added to a sharing event cascade structure to continue the building of a "causal" chain of events that may be scanned backwards in time to locate an originating broadcast.

Furthermore, the sharing analysis system may generate or form links between broadcast nodes and decode nodes (e.g., connecting the activation and decoding of an indexed URL with a specific broadcast event that contains the indexed URL). In one embodiment, such links may be generated based on corresponding broadcast data. In another embodiment, such links may be based on one or more approximations of potential broadcasts and estimated links. The details of generating such links are discussed below.

After generating one or more encode nodes, one or more broadcast nodes, one or more decode nodes, one or more browse nodes, and the corresponding links between such nodes, the sharing analysis system may construct (e.g., generate) one or more sharing event cascade structures. Based on the sharing event cascade structures generated, the sharing patterns associated with one or more content sharing events may be analyzed.

As previously discussed, the sharing analysis system may construct (e.g., generate) one or more sharing event cascade structures based on historical data. It should be noted that the sharing analysis system may also construct (e.g., generate) one or more sharing event cascade structures based on real-time data.

FIG. 1 illustrates a block diagram of a sharing analysis system according to an embodiment of the invention. In one embodiment, a sharing analysis system 100 may communicatively couple any, or a combination, of a sharing event analysis system 102, a sharing point system 106, a URL indexing system 108, and a content publishing system 110 using any, or a combination, of data network 104 and data paths 112, 114, 116, 118. Accordingly, data signals may be transmitted to any of the components of the sharing analysis system 100 and transmitted from any of the components of the sharing analysis system 100 using any, or a combination, of data network 104 and data paths 112, 114, 116, 118. For example, encode data signals, broadcast data signals, decode data signals, browse data signals, or any other data signals may be transmitted to any of the components of the sharing analysis system 100 and transmitted from any of the components of the sharing analysis system 100 using any, or a combination, of data network 104 and data paths 112, 114, 116, 118.

The data network 104 may be a wireless network, a wired network, or any combination of wireless network and wired network. For example, the data network 104 may include any, or a combination, of a fiber optics network, a passive optical network, a radio near field communication network (e.g., a Bluetooth network), a cable network, an Internet network, a satellite network (e.g., operating in Band C, Band Ku, or Band Ka), a wireless local area network (LAN), a Global System for Mobile Communication (GSM), a Personal Communication Service (PCS), a Personal Area Network (PAN), D-AMPS, Wi-Fi, Fixed Wireless Data, IEEE 802.11a, 802.11b, 802.15.1, 802.11n and 802.11g or any other wired or wireless network configured to transmit or receive a data signal. In addition, the data network 104 may include, without limitation, a telephone line, fiber optics, IEEE Ethernet 802.3, a wide area network (WAN), a LAN, or a global network, such as the Internet. Also, the data network 104 may support, an Internet network, a wireless communication network, a cellular network, a broadcast network, or the like, or any combination thereof. The data network 104 may further include one, or any number of the exemplary types of networks mentioned above operating as a stand-alone network or in cooperation with each other. The data network 104 may utilize one or more protocols of one or more network elements to which it is communicatively coupled. The data network 104 may translate to or from other protocols to one or more protocols of network devices. Although the data network 104 is depicted as one network, it should be appreciated that according to one or more embodiments, the data network 104 may comprise a plurality of interconnected networks, such as, for example, a service provider network, the Internet, a broadcaster's network, a cable television network, corporate networks, and home networks.

The sharing event analysis system 102, sharing point system 106, URL indexing system 108, and content publishing system 110 may transmit data to and receive data from the data network 104. The data may be transmitted and received utilizing a standard telecommunications protocol or a standard networking protocol. For example, one embodiment may utilize Session Initiation Protocol (SIP). In other embodiments, the data may be transmitted, received, or a combination of both, utilizing other VoIP or messaging protocols. For example, data may also be transmitted, received, or a combination of both, using Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Transmission Control Protocol/Internet (TCP/IP) Protocols, or other protocols and systems suitable for transmitting and receiving data. Data may be transmitted and received wirelessly or may utilize cabled network or telecom connections such as: an Ethernet RJ45/Category 5 Ethernet connection, a fiber connection, a traditional phone wire-line connection, a cable connection, or other wired network connection. The data network 104 may use standard wireless protocols including IEEE 802.11a, 802.11b, 802.11g, and 802.11n. The data network 104 may also use protocols for a wired connection, such as an IEEE Ethernet 802.3.

The content publishing system 110 may be communicatively coupled to data network 104 via data path 114. The content publishing system 110 may include, but is not limited to, a computer device or communications device. For example, the content publishing system 110 may include a personal computer (PC), a workstation, a mobile device, a thin system, a fat system, a network appliance, an Internet browser, a server, a lap top device, a VoIP device, an ATA, a video server, a Public Switched Telephone Network (PSTN) gateway, a Mobile Switching Center (MSC) gateway, or any other device that is configured to store and display (e.g., digitally publish via a website) content items (e.g., electronic content, digitally published newspaper articles, digitally published magazine articles, electronic books) and store or generate browsing data associated with one or more users that access content items via the content publishing system 110. Details of the content publishing system 110 are provided below.

The URL indexing system 108 may be communicatively coupled to data network 104 via data path 112. The URL indexing system 108 may include, but is not limited to, a computer device or communications device. For example, the URL indexing system 108 may include a personal computer (PC), a workstation, a mobile device, a thin system, a fat system, a network appliance, an Internet browser, a server, a lap top device, a VoIP device, an ATA, a video server, a Public Switched Telephone Network (PSTN) gateway, a Mobile Switching Center (MSC) gateway, or any other device that is configured to index (e.g., encode, shorten) a URL associated with a content item digitally publish via the content publishing system 110, store or generate encode data associated with one or more indexed URLs, de-index (e.g., decode, elongate) an indexed URL of a full version URL, and store or generate decode data associated with one or more activated indexed URLs. The URL indexing system 108 may provide a URL indexing service, such as the URL shortening service provided by www.bit.ly, www.tinyurl.com, or any other URL indexing service. Details of the URL indexing system 108 are provided below.

The sharing point system 106 may be communicatively coupled to data network 104 via data path 106. The sharing point system 106 may include, but is not limited to, a computer device or communications device. For example, the sharing point system 106 may include a personal computer (PC), a workstation, a mobile device, a thin system, a fat system, a network appliance, an Internet browser, a server, a lap top device, a VoIP device, an ATA, a video server, a Public Switched Telephone Network (PSTN) gateway, a Mobile Switching Center (MSC) gateway, or any other device that is configured to store one or more user profiles associated with one or more users of a social network associated with the sharing point system 106, activate content sharing events (e.g., broadcasts, tweets, emails) in response to user input, and store or generate broadcast data associated with one or more content sharing events. Details of the sharing point system 106 are provided below.

The sharing event analysis system 102 may be communicatively coupled to data network 104 via data path 118. The sharing event analysis system 102 may include, but is not limited to, a computer device or communications device. For example, the sharing event analysis system 102 may include a personal computer (PC), a workstation, a mobile device, a thin system, a fat system, a network appliance, an Internet browser, a server, a lap top device, a VoIP device, an ATA, a video server, a Public Switched Telephone Network (PSTN) gateway, a Mobile Switching Center (MSC) gateway, or any other device that is configured to access browsing data, encode data, broadcast data, and decode data associated with one or more content sharing events, generate one or more sharing event cascade structures based on the browsing data, encode data, broadcast data, and decode data accessed, generate and output (e.g., display) a content sharing visualization diagram based on the one or more sharing event cascade structures generated, and calculate cascade statistics associated with one or more content sharing events. Details of the sharing event analysis system 102 are provided below.

The data paths disclosed herein may include any device that communicatively couples devices to each other. For example, a data path may include one or more networks or one or more conductive wires (e.g., copper wires).

Figure 2:
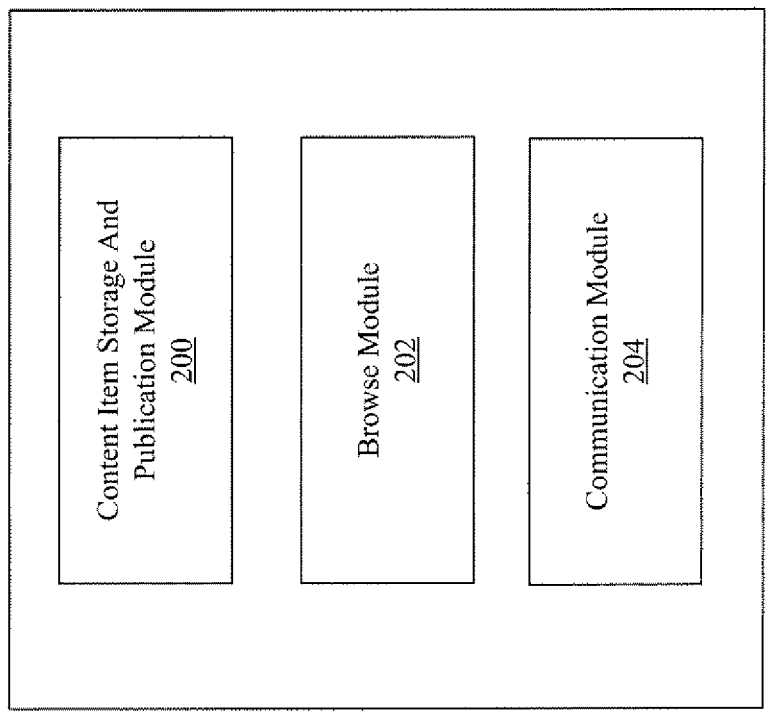
FIG. 2 illustrates exemplary modules of a content publishing system according to an embodiment of the invention.

FIG. 2 illustrates exemplary modules of a content publishing system according to an embodiment of the invention. In an exemplary embodiment, the content publishing system 110 may include a content item storage and publication module 200, a browse module 202, and a communication module 204. It is noted that modules 200, 202, and 204 are exemplary. The functions of modules 200, 202, and 204 may be performed at other modules remote or local to the content publishing system 110, and modules 200, 202, and 204 may be combined or separated. Other modules may be provided as necessary and/or desired.

The communication module 204 may include computer-implemented software, hardware, or a combination of both, configured to provide communication between the content publishing system 110 and any, or a combination, of the URL indexing system 108, the sharing point system 106, and the sharing event analysis system 102 via data network 104 and data path 114. In one embodiment, the communication module 204 may be configured to receive or transmit data signals to and from one or more components of the sharing analysis system 100. In another embodiment, the communication module 204 may be configured to transmit the data signals or messages received from other components in the sharing analysis system 100 to the other modules 200 and 202 and may communicate data signals or messages received from the other modules 200 and 202 to other components in the sharing analysis system 100. The communication module 204 may be configured to transmit data signals and messages between the modules 200, 202 and 204 of the content publishing system 110.

The content item storage and publication module 200 may include computer-implemented software, hardware, or a combination of both, configured to store and display (e.g., digitally publish) one or more content items. A content item may include any, or a combination, of electronic content, digitally published newspaper articles, digitally published magazine articles, and electronic books. In one embodiment, the content item storage and publication module 200 may digitally publish one or more stored content items via a website. By way of a non-limiting example, the content item storage and publication module 200 may store and digitally publish an electronic newspaper article entitled "Yankees Win The World Series!" on www.nytimes.com. In another example, the content item storage and publication module 200 may store and digitally publish another electronic newspaper article entitled "New York Braces For Winter Storm" on www.nytimes.com. In yet another example, the content item storage and publication module 200 may store and digitally publish another electronic newspaper article entitled "A History Of The New York Subway System" on www.nytimes.com.

The browse module 202 may include computer-implemented software, hardware, or a combination of both, configured to track browsing activity. In one embodiment, the browse module 202 may be configured to generate and store browsing data for each client device (e.g., user of a client device) that accesses and views one or more content items. In such an embodiment, the browse module 202 may generate browsing data based on an IP address associated with a client device of the user accessing and viewing the one or more content items.

In certain embodiments, the browse module 204 may track browsing activity using one or more web cookies, browser cookies, or any other computer-implemented software or hardware configured to track browsing activity. Accordingly, the browse module 202 may generate browsing data based on the browsing activity tracked. For example, browsing data may include any, or a combination, of data that indicates a user accessed (e.g., viewed, downloaded) a content item, data that indicates an IP address associated with a client device of a user that accessed a content item, data that indicates a time at which a user accessed a content item, and data that indicates a location of a user that accessed a content item.

Figure 3:
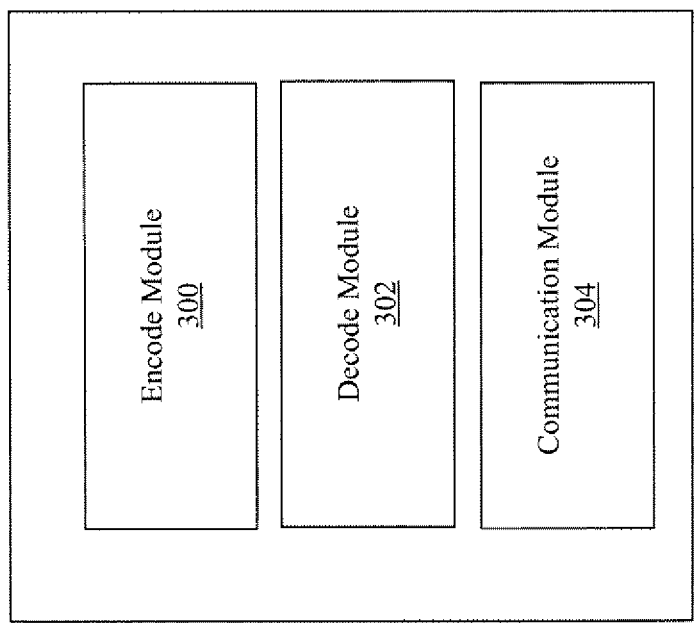
FIG. 3 illustrates exemplary modules of a uniform resource locator (URL) indexing system according to an embodiment of the invention.

FIG. 3 illustrates exemplary modules of a URL indexing system according to an embodiment of the invention. In an exemplary embodiment, the URL indexing system 108 may include an encode module 300, a decode module 302, and a communication module 304. It is noted that modules 300, 302, and 304 are exemplary. The functions of modules 300, 302, and 304 may be performed at other modules remote or local to the URL indexing system 108, and modules 300, 302, and 304 may be combined or separated. Other modules may be provided as necessary and/or desired.

The communication module 304 may include computer-implemented software, hardware, or a combination of both, configured to provide communication between the URL indexing system 108 and any, or a combination, of the content publishing system 110, the sharing point system 106, and the sharing event analysis system 102 via data network 104 and data path 112. In one embodiment, the communication module 304 may be configured to receive or transmit data signals to and from one or more components of the sharing analysis system 100. In another embodiment, the communication module 304 may be configured to transmit the data signals or messages received from other components in the sharing analysis system 100 to the other modules 300 and 302 and may communicate data signals or messages received from the other modules 300 and 302 to other components in the sharing analysis system 100. The communication module 304 may be configured to transmit data signals and messages between the modules 300 and 302 of the URL indexing system 108.

The encode module 300 may include computer-implemented software, hardware, or a combination of both, configured to index (e.g., encode, shorten) a full version of a URL of a content item. In one embodiment, indexing a full version of a URL of a content item may include creating a shortened version of the URL by hashing the URL using a hash function.

The encode module 300 may be configured to store encode data for each indexed URL. Encode data may include any data that indicates a characteristic associated with the indexing and encoding of a URL of a content item. For example, encode data may include any, or a combination, of data that indicates a full version of a URL associated with an indexed URL, data that indicates an indexed version of a URL (e.g., a shortened version of a URL, a URL hash, an encoded version of a URL), data that indicates an IP address associated with a client device of a user that initiated the indexing (or encoding) of a URL, data that indicates the date an indexed URL was created, data that indicates the time an indexed URL was created, and data that indicates the location associated with a client device of a user that initiated the indexing (or encoding) of a URL.

By way of a non-limiting example, the encode module 300 may encode the full version of the URL of the electronic newspaper article entitled "New York Braces For Winter Storm" using a hash function. Accordingly, the encode module 300 may store encode data that indicates that the full version of the indexed URL is "http://www.nytimes.com/2010/12/16/weather/local/wintemyc.html?rep1& hpwtelsdk," the indexed URL is "http://nyti.ms/hHpkcE," the IP address associated with the client device of a user that initiated the indexing (e.g., encoding) of the URL is 123.111.56.176, the indexed URL was created on Friday, Dec. 17, 2010, the indexed URL was created at 9:06:42 AM, and the location of the client device of the user that initiated the indexing is New York, N.Y.

In certain embodiments, the encode module 300 may be configured to generate one indexed URL (e.g., a URL hash) for each URL indexed. That is, the same indexed URL (e.g., a URL hash) may be provided to each user that initiates the indexing of a URL of a particular content item. In other embodiments, the encode module 300 may be configured to generate a unique indexed URL each time a user initiates the indexing of a URL of a particular content item. In such embodiments, the encode module 300 may be configured to generate a unique indexed URL each time a subscribing user (e.g., a user that subscribes to the indexing service provided by the URL indexing system 108) initiates the indexing of a URL of a particular content item.

The decode module 302 may include computer-implemented software, hardware, or a combination of both, configured to de-index (e.g., decode, elongate) an indexed URL of the corresponding full version URL. In one embodiment, de-indexing an indexed URL associated with a content item may include replacing the indexed URL with the corresponding full version URL. The decode module 302 may de-index (e.g., decode) an indexed URL activated by a user (e.g., a user of a social network, a user of the sharing point system 106 that received the indexed URL via a content sharing event, an Internet user that received the indexed URL via an email message).

The decode module 302 may be configured to generate and store decode data associated with each indexed URL activated and decoded. Decode data may include any data that indicates a characteristic associated with activating and decoding an indexed URL. For example, decode data may include any, or a combination, of data that indicates an indexed URL (e.g., a shortened URL, an encoded URL, a URL hash) that has been activated, data that indicates an IP address associated with a client device of a user that initiated the activation and decoding of an indexed URL, data that indicates client software used by the client device, data that indicates the date an indexed URL was activated and decoded, and data that indicates the time an indexed URL was activated and decoded.

Figure 4:
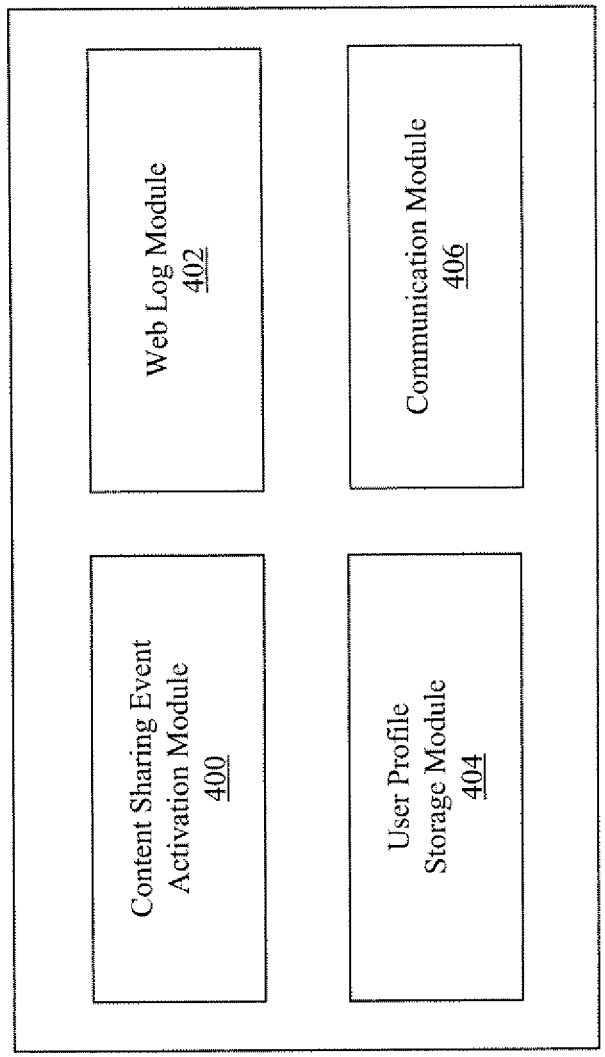
FIG. 4 illustrates exemplary modules of a sharing point system according to an embodiment of the invention.

FIG. 4 illustrates exemplary modules of a sharing point system according to an embodiment of the invention. In an exemplary embodiment, the sharing point system 106 may include a content sharing event activation module 400, a web log module 402, a user profile storage module 404, and a communication module 406. It is noted that modules 400, 402, 404, and 406 are exemplary. The functions of modules 400, 402, 404, and 406 may be performed at other modules remote or local to the sharing point system 106, and modules 400, 402, 404, and 406 may be combined or separated. Other modules may be provided as necessary and/or desired.

The communication module 406 may include computer-implemented software, hardware, or a combination of both, configured to provide communication between the sharing point system 106 and any, or a combination, of the content publishing system 110, the URL indexing system 108, and the sharing event analysis system 102 via data network 104 and data path 116. In one embodiment, the communication module 406 may be configured to receive or transmit data signals to and from one or more components of the sharing analysis system 100. In another embodiment, the communication module 406 may be configured to transmit the data signals or messages received from other components in the sharing analysis system 100 to the other modules 400, 402, and 404 and may communicate data signals or messages received from the other modules 400, 402, and 404 to other components in the sharing analysis system 100. The communication module 406 may be configured to transmit data signals and messages between the modules 400, 402, and 404 of the sharing point system 106.

The content sharing event activation module 400 may include computer-implemented software, hardware, or a combination of both, configured to activate a content sharing event in response to input from a user. In one embodiment, a content sharing event may include any event in which a content item or data associated with a content item (e.g., an indexed URL) is shared between at least two users of the sharing point system 106. For example, the content sharing event activation module 400 may activate a first content sharing event (e.g., a broadcast) that shares a first indexed URL between a first user (e.g., John) of the sharing point system 106 and 30 other users of the sharing point system 106. In another example, the content sharing event activation module 400 may activate a second content sharing event (e.g., a tweet) that shares a second indexed URL between a second user (e.g., Joan) of the sharing point system 106 and 1 million other users of the sharing point system 106. In yet another example, the content sharing event activation module 400 may activate a third content sharing event (e.g., an email) that shares a third indexed URL between a third user (e.g., Mike) of the sharing point system 106 and 100 other users of the sharing point system 106.

The web log module 402 may include computer-implemented software, hardware, or a combination of both, configured to log (e.g., store) broadcast data for each indexed URL broadcasted via a content sharing event. Broadcast data may include any data that indicates a characteristic associated with the broadcasting of an indexed URL. For example, broadcast data may include any, or a combination, of data that indicates an indexed URL (e.g., a shortened URL, an encoded URL, a URL hash) broadcasted, data that indicates a user profile associated with a user that broadcasted an indexed URL, data that indicates the date an indexed URL was broadcasted, data that indicates the time an indexed URL was broadcasted, data that indicates the IP address of a client device used by a user to activate a broadcast event, data that indicates the location from which an indexed URL was broadcasted, and data that indicates the users (user profiles) of the sharing point system 106 to which an indexed URL has been broadcasted.

The user profile storage module 404 may include computer-implemented software, hardware, or a combination of both, configured to store one or more user profiles for one or more users of the sharing point system 106. A user profile may include a collection of data that indicates one or more characteristics of a particular user. For example, a user profile may include any, or a combination, of a first name portion, a last name portion, a location portion, a demographic portion, and any other portions that may be used to describe a characteristic of a particular user.

Figure 5:
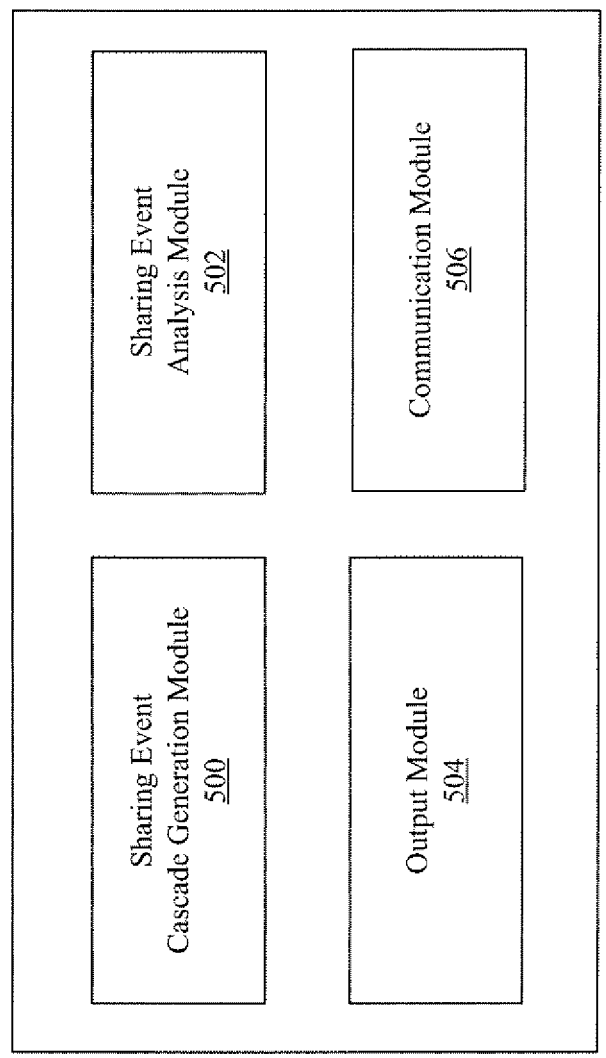
FIG. 5 illustrates exemplary modules of a sharing event analysis system according to an embodiment of the invention.

FIG. 5 illustrates exemplary modules of a sharing event analysis system according to an embodiment of the invention. In an exemplary embodiment, the sharing event analysis system 102 may include a sharing event cascade generation module 500, a sharing event analysis module 502, an output module 504, and a communication module 506. It is noted that modules 500, 502, 504, and 506 are exemplary. The functions of modules 500, 502, 504, and 506 may be performed at other modules remote or local to the sharing event analysis system 102, and modules 500, 502, 504, and 506 may be combined or separated. Other modules may be provided as necessary and/or desired.

The communication module 506 may include computer-implemented software, hardware, or a combination of both, configured to provide communication between the sharing event analysis system 102 and any, or a combination, of the sharing point system 106, the content publishing system 110, and the URL indexing system 108 via data network 104 and data path 118. In one embodiment, the communication module 506 may be configured to receive or transmit data signals to and from one or more components of the sharing analysis system 100. In another embodiment, the communication module 506 may be configured to transmit the data signals or messages received from other components in the sharing analysis system 100 to the other modules 500, 502, and 504 and may communicate data signals or messages received from the other modules 500, 502, and 504 to other components in the sharing analysis system 100. The communication module 506 may be configured to transmit data signals and messages between the modules 500, 502, and 504 of the sharing event analysis system 102.

The sharing event cascade generation module 500 may include computer-implemented software, hardware, or a combination of both, configured to generate sharing event cascade structures. A sharing event cascade structure may include a collection of connected sharing event nodes that illustrate a history of one or more content items being shared among users of a social network (e.g., users of www.twitter.com) across a network (e.g., the Internet) that begins at a particular point-in-time. Each sharing event cascade structure may include one or more sharing event nodes. A sharing event node may include any, or a combination, of one or more encode nodes, one or more broadcast nodes, one or more decode nodes, and one or more browse nodes.

An encode node may include a point in a sharing event cascade structure that indicates that a URL of a content item digitally published on a website (e.g., a website implemented by the content publishing system 110) has been indexed (e.g., by the URL indexing system 108) in response to input from a user that accessed (e.g., viewed) the content item on the website. A broadcast node may include a point in a sharing event cascade structure that indicates that an indexed URL associated with a content item digitally published on a website has been shared with one or more users of a social network via one or more content sharing events (e.g., one or more broadcasts, one or more tweets, one or more emails) initiated in response to input from a user who accessed (e.g., viewed) the content item on the website. A decode node may include a point in a sharing event cascade structure that indicates that an indexed URL associated with a content item digitally published on a website has been activated by a user and decoded. A browse node may include a point in a sharing event cascade structure that indicates that a content item associated with a decoded URL (full version URL) has been browsed by a user (e.g., a user of a social network that activated an indexed URL associated with the decoded URL via a tweet).

The connections between the sharing event nodes of a sharing event cascade structure may be determined based on any, or a combination, of corresponding browsing data, corresponding encode data, corresponding broadcast data, and corresponding decode data. Each sharing event cascade structure may include an encode root node, at least one broadcast branch node, at least one decode branch node, and at least one browse leaf node.

In one embodiment, the sharing event cascade generation module 500 may generate one or more sharing event cascade structures based on one or more content sharing events that occur at, near, after, or before a particular date and a particular time. For example, sharing event cascade generation module 500 may generate sharing event cascade structures based on one or more content sharing events that occurred prior to 12:00 PM (EST) on Dec. 15, 2010. In another example, sharing event cascade generation module 500 may generate sharing event cascade structures based on one or more content sharing events that occurred at 2:00 PM (CST) on Dec. 15, 2010. In yet another example, sharing event cascade generation module 500 may generate sharing event cascade structures based on one or more content sharing events that occurred after 5:00 PM (PCT) on Dec. 15, 2010.

In one embodiment, the particular date and particular time may be automatically determined based on a maximum or minimum number of content sharing events to be analyzed. In another embodiment, the particular date and particular time may be determined based design preferences.

In another embodiment, the sharing event cascade generation module 500 may generate one or more sharing event cascade structures based on one or more content sharing events that occur within a particular time frame. For example, sharing event cascade generation module 500 may generate sharing event cascade structures based on one or more content sharing events that occurred after 2:00 PM (EST) on Dec. 15, 2010 and before 3:00 PM (EST) on Dec. 17, 2010. In another example, sharing event cascade generation module 500 may generate sharing event cascade structures based on one or more content sharing events that occurred after 9:00 PM (PCT) on Dec. 1, 2010 and before 9:00 PM (EST) on Dec. 15, 2010.

In one embodiment, the particular time frame may be automatically determined based on a maximum or minimum number of content sharing events to be analyzed. In another embodiment, the particular time frame may be determined based design preferences.

The sharing event cascade generation module 500 may initiate the generation of a link between a browse node and an encode node in the sharing event cascade structure by accessing the content publishing system 110, the URL indexing system 108, or a combination of both, to determine whether a user browsing the content item site has initiated the indexing of a URL of a content item digitally published on the website. Based on a comparison of the browsing data to the encode data accessed, the sharing event cascade generation module 500 may generate one or more links to encode nodes. For example, the sharing event cascade generation module 500 may compare the IP addresses associated with the browsing data to the IP addresses associated with the encode data to determine whether a user that accessed a content item via the content publishing system 110 also initiated the indexing of a URL of the content item. If a match exists (e.g., a match in IP addresses), the sharing event cascade generation module 500 may generate a link to an encode node of the sharing event cascade structure.

The sharing event cascade generation module 500 may then continue to generate a sharing event cascade structure by accessing the sharing point system 106 to locate and access broadcast data and the URL indexing system 108 to locate and access encode data. If, for example, the sharing event cascade generation module 500 determines a match exists between the encode data stored in the URL indexing system 108 and the broadcast data stored in the sharing point system 106 (e.g., a match on indexed URL or URL hash, a match on date and time within a predetermined threshold), a link between an encode node and a broadcast node of the sharing event cascade structure may be generated.

The sharing event cascade generation module 500 may then continue to generate a sharing event cascade structure by accessing the URL indexing system 108 to locate and access decode data and the content publishing system 110 to locate and access browsing data. If, for example, the sharing event cascade generation module 500 locates decode data that indicates that an indexed URL has been activated by one or more users, the content publishing system 110 may be accessed to locate and access matching browsing data (e.g., browsing data that matches on IP address) associated with the activated indexed URL. The sharing event cascade generation module 500 may generate a link between a decode node and a browser node for each data match.

As previously discussed, decode data may be generated each time a user (e.g., a client device of a user) initiates decoding of an indexed URL. The decode data (e.g., an IP address) associated with an indexed URL may enable the sharing event cascade generation module 500 to form a connection between one or more decode nodes and one or more browser nodes (e.g., any subsequent activity by the client device on a website implemented by the content publishing system 110). That is, the decode data associated with an indexed URL may enable the sharing event analysis system 102 to move forward in time from a decode node in a sharing event cascade structure to one or more browser nodes in the sharing event cascade structure that indicate subsequent browsing activity.

Creating a link between a decode node and one or more broadcast nodes may be more difficult depending on the available data. That is, moving backward in time to attribute a particular decode to a particular content sharing event may involve a series of steps since many content sharing events may use the same indexed URL.

In one embodiment, the sharing event cascade generation module 500 may associate a single decode node with a single content sharing event (e.g., broadcast node). Accordingly, the sharing event cascade structure may be maintained as a tree with each node being associated with a single parent node.

Various techniques may be used to associate (or attribute) a decode to a particular content sharing event. In one embodiment, the sharing event cascade generation module 500 may associate a decode with the first content sharing event that broadcasts an indexed URL associated with the decode. In another embodiment, the sharing event cascade generation module 500 may associated a decode with the most recent content sharing event that broadcasts an indexed URL associated with the decode.

In yet another embodiment, the sharing event cascade generation module 500 may use one or more probabilistic models to choose the most likely content sharing event attributable to a decode. In such an embodiment, the sharing event cascade generation module 500 may maintain a table of weights or probabilities that indicate the likelihood that a particular decode is associated with each potential content sharing event (e.g., candidate content sharing event). The content sharing event associated with the largest weight or probability may be selected.

In one embodiment, such a weighting scheme may utilize a probabilistic mixture model. The probabilistic mixture model may be defined based on a hypothesis of the mechanism that created data associated with one or more decodes. By way of a non-limiting example, such a probabilistic mixture model may be defined as follows.

A sequence of times may be given as $T_1, T_2, \ldots T_m$, at which in content sharing events have taken place and another sequence of times may be given as $t_1, t_2, \ldots, t_n$, at which n decodes have taken place. Next, $f_i$ may denote one or more users of a social network associated with a user that initiates a content sharing event i. Next, it may be assumed that a pattern associated with the times of decodes that occur in response to a content sharing event i is a mixture of two exponential distributions. The first exponential distribution, $\beta_{1i}$ may capture an initial burst of activity (e.g., the observance of an initial spike in decodes) that is generated as a result of the content sharing event i. The mean of the $\beta_{1i}$ exponential distribution may be on the order of minutes. The second exponential distribution, $\beta_{2i}$, may capture longer-term activity that is generated as a result of the content sharing event i. The mean of the $\beta_{2i}$ exponential distribution may be on the order of hours. The probability balancing these distributions may be denoted as $\alpha_i$.

The n decodes may be assumed to be generated from the following probability distribution. For each decode $j=1, \ldots, n$, one of the m content sharing events with a probability $p_i \geq 0$, where $p_1 + \ldots + p_m = 1$ may be chosen. This choice may be denoted as i* (e.g., i*=5) for one round of a simulation (e.g., one round of modeling). Next, the first exponential distribution (e.g., with probability $\alpha_{i*}$) or the second exponential distribution (e.g., with probability $1-\alpha_{i*}$) may be selected. An observation may then be drawn from the selected exponential distribution denoted as $Z^*$. Thus, the time of the jth decode may be $T_{j*}+Z^*$, some time after the selected content sharing event $T_{j*}$.

Accordingly, the probabilistic mixture model may include the following steps: (1) Select a sharing event at random from $\{T_1, T_2, \ldots, T_m\}$, where the probability of $T_i$ is $p_i(p_i \geq 0$ and $p_1 + \ldots + p_m = 1)$ and $T_{j*}$ is the selected content sharing event; (2) For this content sharing event, choose between a first exponential distribution (e.g., short delay) with probability $\alpha_{j*}$ and a second exponential distribution (e.g., long delay) with probability $1-\alpha_{j*}(\alpha_{j*} \geq 0)$; and (3) generate a decode at $T_{j*}+Z^*$.

If a short delay is selected, an observation $Z^*$ from the exponential distribution with mean $1/\lambda_{1j*}$ (density function $1/\lambda_{1j*}e^{-\lambda z}$, $z \geq 0$) may be generated. If a long delay is selected, an observation $Z^*$ from the exponential distribution with mean $1/\lambda_{2j*}$ (density function $1/\lambda_{2j*}e^{-\lambda z}$, $z \geq 0$) may be generated. Accordingly, the probabilistic mixture model may describe how an observed set of decodes were generated.

Given actual decode times $t_1, t_2, \ldots, t_n$, the probabilistic mixture model may be fitted and estimates for values of the parameters $p_i, \alpha_i, \lambda_{1i}$, and $\lambda_{2i}$ may be generated. Furthermore, the probability that each observed decode is associated with content sharing events $T_1, T_2, \ldots, T_m$ may be assessed.

In one embodiment, a Bayesian approach may be taken as follows. First, prior probabilities may be assigned to the parameters in the model. The probabilities $p_1, \ldots, p_m$, may be first assigned a Dirichlet distribution with parameters log (f1+1), ..., log (fm+1). That is:

$$P(p_1, \ldots, p_m) \propto p^{\log(f1+1)-1} \ldots p^{\log(fm+1)-1}$$

where $f_i$ is the amount of users of a social network that are associated with a user that initiated a content sharing event i at $T_i$ and $f_i \geq 0$. Any monotone transformation of the $f_i$ may be reasonable. In other embodiments, the square root or cube root may be used.

The prior probability on each short and long component of $\alpha_i$ may be a beta distribution chosen to favor the short-term over the long-term. Finally, the two exponential (inverse) means $\lambda_{1i}$ and $\lambda_{2i}$ may be gamma priors with each having a shape parameter one and scale parameters (24*60)/5 (e.g., corresponding to a burst of about 5 minutes) and 24 (e.g., corresponding to an hour), respectively. Such specifications may capture the idea that a content sharing event usually results in an initial burst of activity followed by additional activity that may linger (e.g., for hours, for days).

Various techniques may be used to fit the probabilistic mixture model. For example, the Expectation-Maximization algorithm may be used to fit the probabilistic mixture model. In another example, the Gibbs sampler algorithm may be used to fit the probabilistic mixture model.

Based on the browsing data, encode data, broadcast data, decode data, and probabilistic techniques described above, the sharing event cascade generation module 500 may generate one or more sharing event cascade structures.

The sharing event analysis module 502 may include computer-implemented software, hardware, or a combination of both, configured to collect user profile data associated with one or more content sharing events. In one embodiment, the sharing event analysis module 502 may collect user profile data associated with a user broadcasting a indexed URL and one or more additional users activating the broadcasted indexed URL while a sharing event cascade structure is being generated.

The sharing event analysis module 502 may analyze one or more sharing event cascade structures and user profile data to generate one or more cascade statistics. A cascade statistic may include any numerical value derived from the data accessed to generate a sharing event cascade structure and the corresponding user profile data. For example, a cascade statistic may indicate a characteristic associated with the types of content items being shared, the locations of the users sharing the content items, the times the content items are being shared, the explanation text associated with a content sharing event (e.g., annotations), the topics of the content items being shared, the demographics of the users sharing the content items, and any other statistic.

The output module 504 may include computer-implemented software, hardware, or a combination of both, configured to output (e.g., display) one or more sharing event cascade structures in a content sharing visualization diagram. A content sharing visualization diagram may illustrate a relationship between one or more sharing event cascade structures over time. In one embodiment, the output module 504 may output the content sharing visualization diagram in a cascade view. In another embodiment, the output module 504 may output the content sharing visualization diagram in a story view. In another embodiment, the output module 504 may output the content sharing visualization diagram in a tree view. In another embodiment, the output module 504 may output the content sharing visualization diagram in a bar graph view. In another embodiment, the output module 504 may output the content sharing visualization diagram in a radar view.

Figure 6:
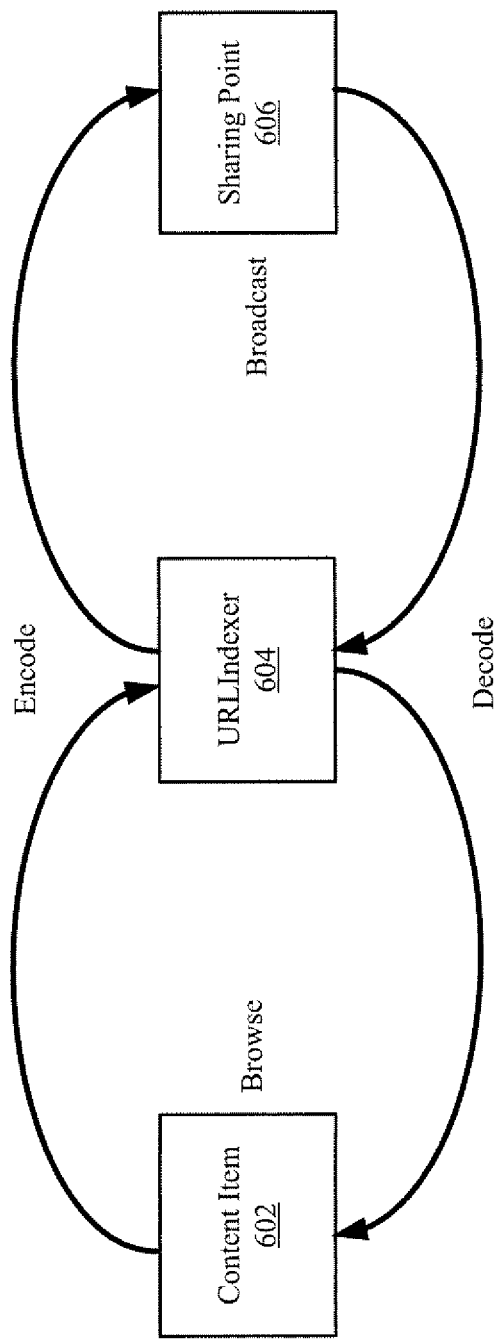
FIG. 6 illustrates an example diagram of a life cycle of a sharing pattern associated with a content sharing event according to an embodiment of the invention.

FIG. 6 illustrates an example diagram of a life cycle of a sharing pattern associated with a content sharing event according to an embodiment of the invention. As illustrated in FIG. 6, a user viewing (or browsing) a content item 602 digitally published on a website (e.g., a website implemented by content publishing system 110) may initiate the indexing of a URL of the content item 602 for sharing purposes. Based on the initiation, the URL of the content item may be indexed (e.g., encoded) into a URL hash (e.g., an indexed URL) using a URL indexing service 604. The user may then share the URL hash with multiple other users of a sharing point 606 (e.g., a social network) through one or more content sharing events (e.g., one or more broadcasts, one or more tweets, one or more emails). Based on the content sharing events, one or more of the multiple other users of sharing point 606 may activate the URL hash provided in the broadcast to view the content item associated with the URL hash. The URL hash may then be de-indexed (e.g., decoded, elongated) to provide the full version URL of the content item. Finally, the content item may be viewed by the one or more users that activated the URL hash.

The sharing event analysis system 102 may trace and construct the life cycle of one or more sharing patterns by accessing browsing data, encode data, broadcast data, and decode data stored in various systems (e.g., content publishing system 110, URL indexing system 108, sharing point system 106). Based on the data accessed, one or more sharing event cascade structures may be generated and user profile data associated with the one or more sharing event cascade structures may be analyzed.

FIG. 7 illustrates an example table containing data resources for constructing sharing event cascade structures according to an embodiment of the invention. As illustrated in FIG. 7, the sharing event analysis system 102 may use data generated by various systems (e.g., content publishing system 110, URL indexing system 108, sharing point system 106) to construct one or more sharing event cascade structures. For example, the sharing event analysis system 102 may access the web server logs (or databases) associated with a content publishing system 110 to identify one or more content items browsed by a user (by IP address). The data provided by the web server logs (e.g., browsing data) may be compared to data generated and stored in the URL indexing system 108 to generate one or more encode nodes.

In another example, the sharing event analysis system 102 may access the URL indexing system 108 to identify one or more indexed URLs. The data provided by the URL indexing system 108 (e.g., encode data) may be compared to data generated and stored in the sharing point system 106 (e.g., broadcast data) to generate one or more broadcast nodes.

In another example, the sharing event analysis system 102 may access the URL indexing system 108 to identify one or more indexed URLs that have been activated. The data provided by the URL indexing system 108 (e.g., decode data) may be compared to data generated and stored in the content publishing system 110 (e.g., browsing data) to generate one or more decode nodes and one or more browse nodes.

FIG. 8A illustrates an example diagram of a sharing event cascade structure key according to an embodiment of the invention. As illustrated in FIG. 8A, encode nodes may be illustrated as checkered boxes, broadcast nodes may be illustrated as boxes with vertical lines, decode nodes may be illustrated as boxes with horizontal lines, and browse nodes may be illustrated as white boxes.

Figure 8B:
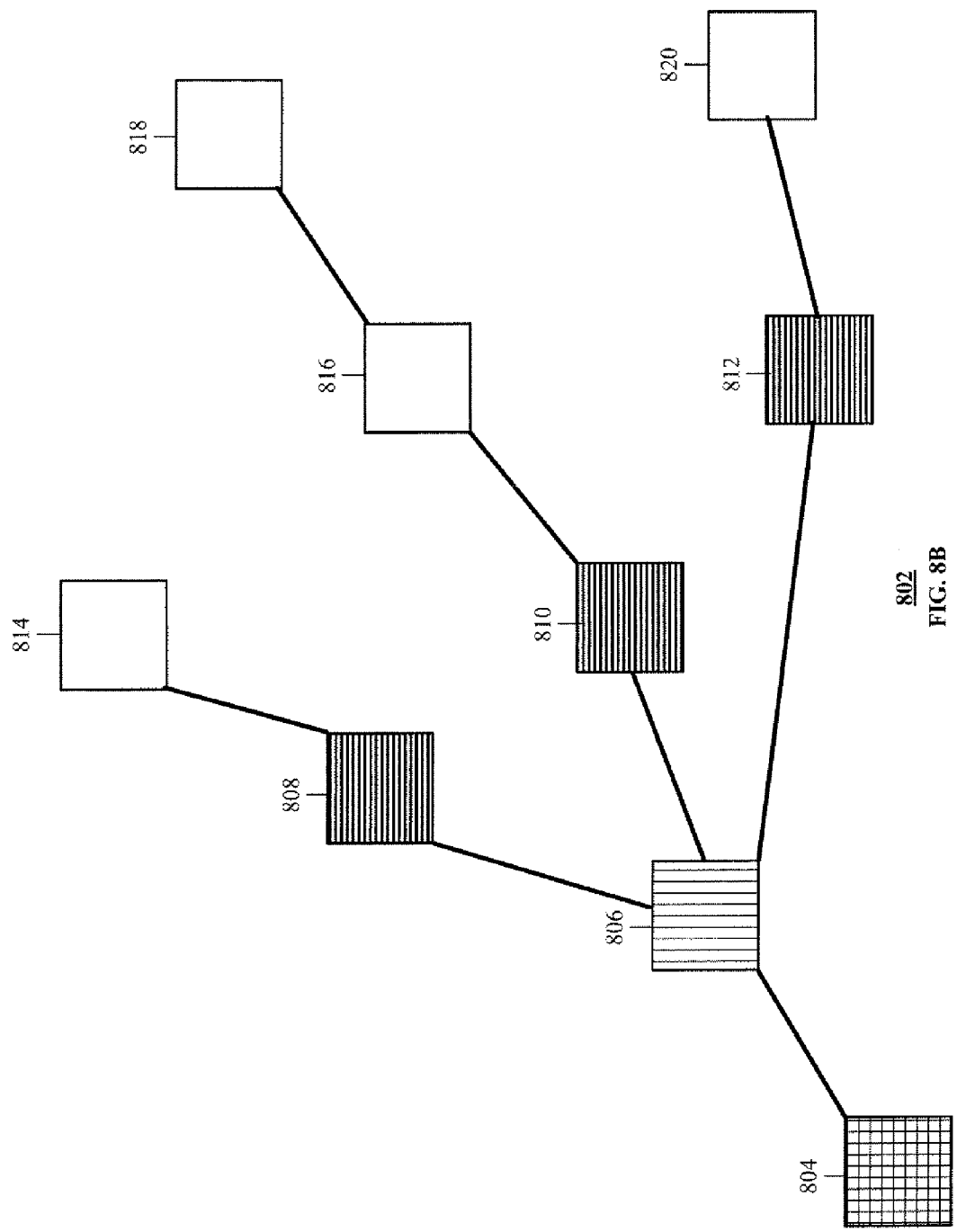
FIG. 8B illustrates an example diagram of a sharing event cascade structure according to an embodiment of the invention.

FIG. 8B illustrates an example diagram of a sharing event cascade structure according to an embodiment of the invention. As illustrated in FIG. 8B, a sharing event cascade structure 802 may include a collection of connected sharing event nodes. By way of a non-limiting example, the sharing event cascade structure 802 may include encode node 804 (e.g., a root node), broadcast node 806 (e.g., a branch node), decode nodes 808, 810, 812 (e.g., branch nodes), and browse nodes 814, 818, 820 (e.g., leaf nodes), and browse node 816 (e.g., branch node).

As previously discussed, connections between the sharing event nodes of sharing event cascade structure 802 may be determined based on any, or a combination, of corresponding browsing data, corresponding encode data, corresponding broadcast data, and corresponding decode data. Accordingly, the sharing event analysis system 102 may construct sharing event cascade structure 802 based on matches (e.g., approximate matches, fuzzy matches, partially fuzzy matches) between browsing data, encode data, tweet data, and decode data.

Figure 9A:
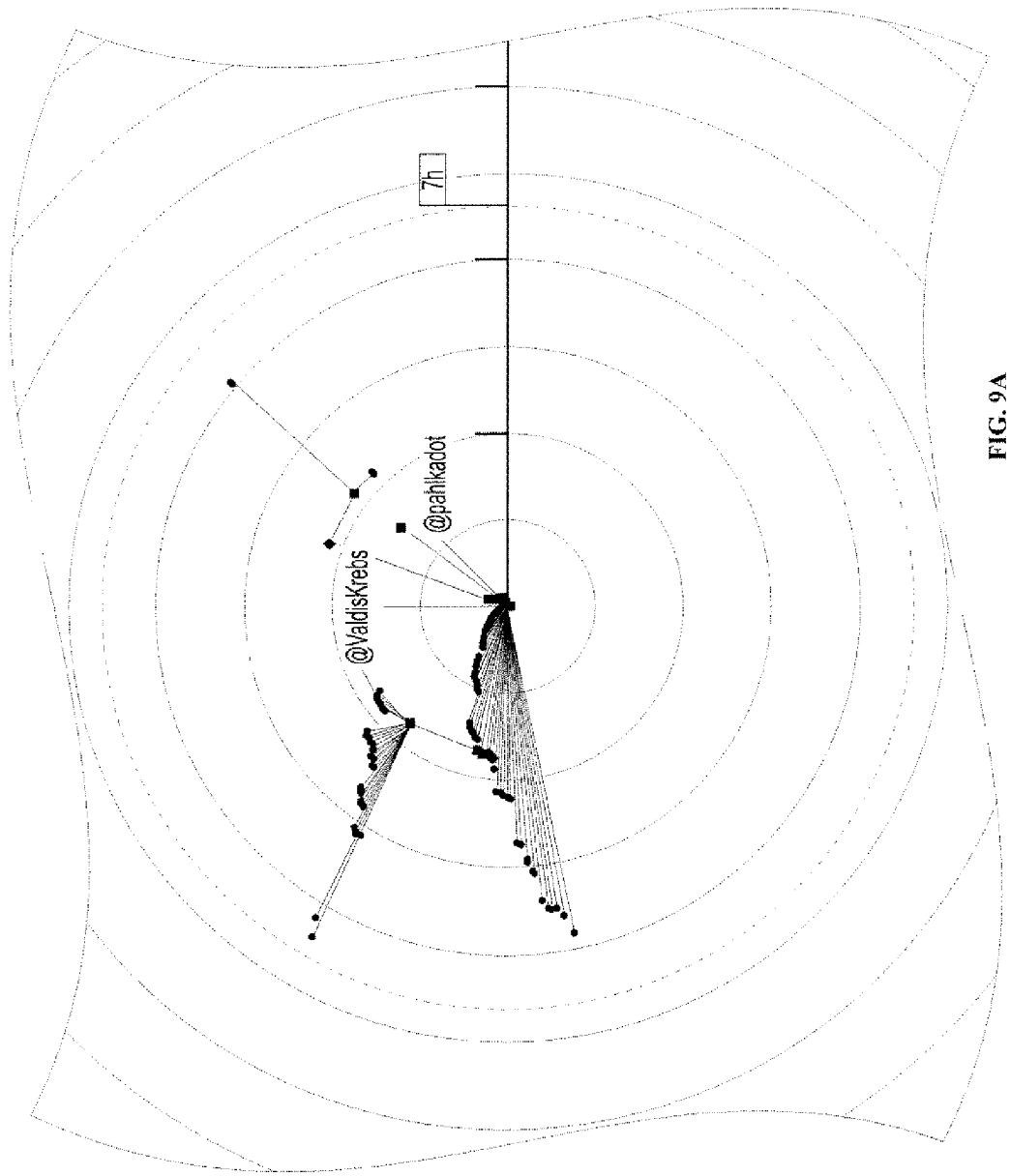
FIG. 9A illustrates an example content sharing visualization diagram in a top view depicting the initial building of a sharing event cascade structure according to an embodiment of the invention.

FIG. 9A illustrate an example content sharing visualization diagram in a top view depicting the initial building of a sharing event cascade structure according to an embodiment of the invention. Furthermore, FIGS. 9B and 9C illustrate an example content sharing visualization diagram in a top view depicting the continuation of the building of a sharing event cascade structure according to an embodiment of the invention.

Figure 9B:
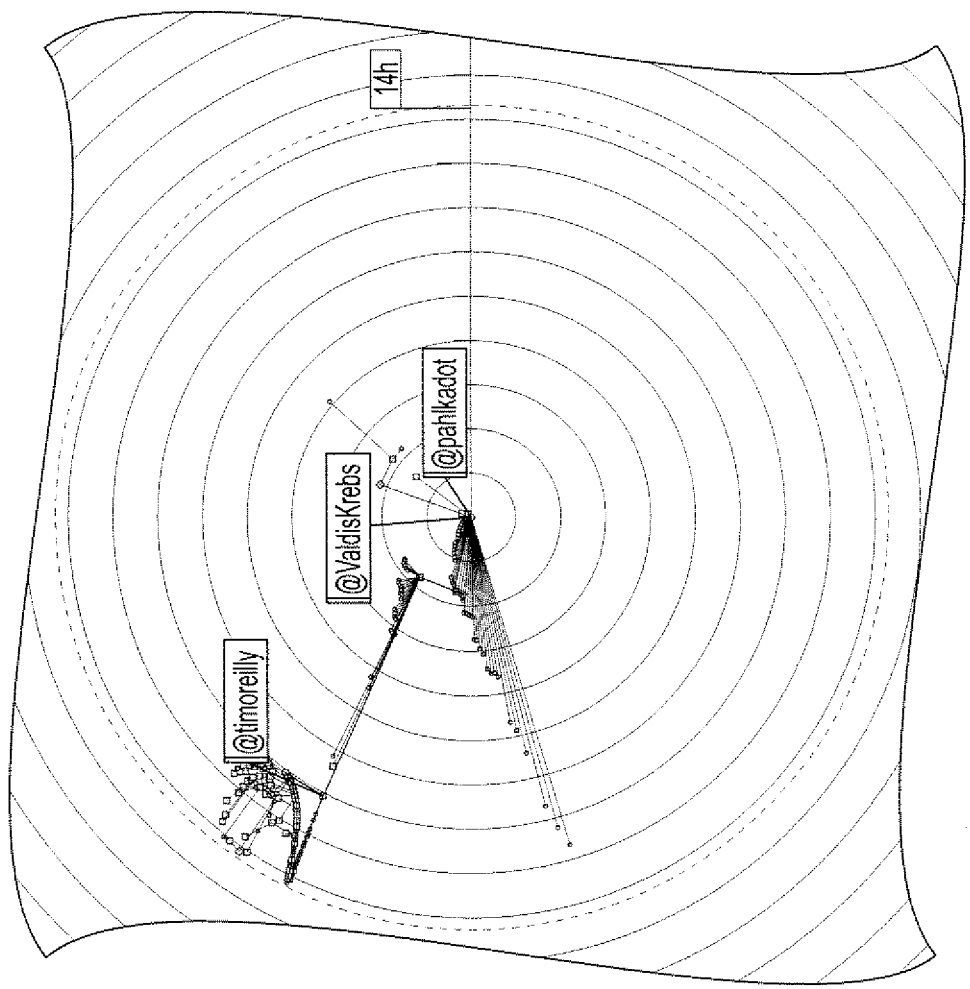
FIG. 9B illustrates an example content sharing visualization diagram in a top view depicting the continuation of the building of a sharing event cascade structure according to an embodiment of the invention.
Figure 9C:
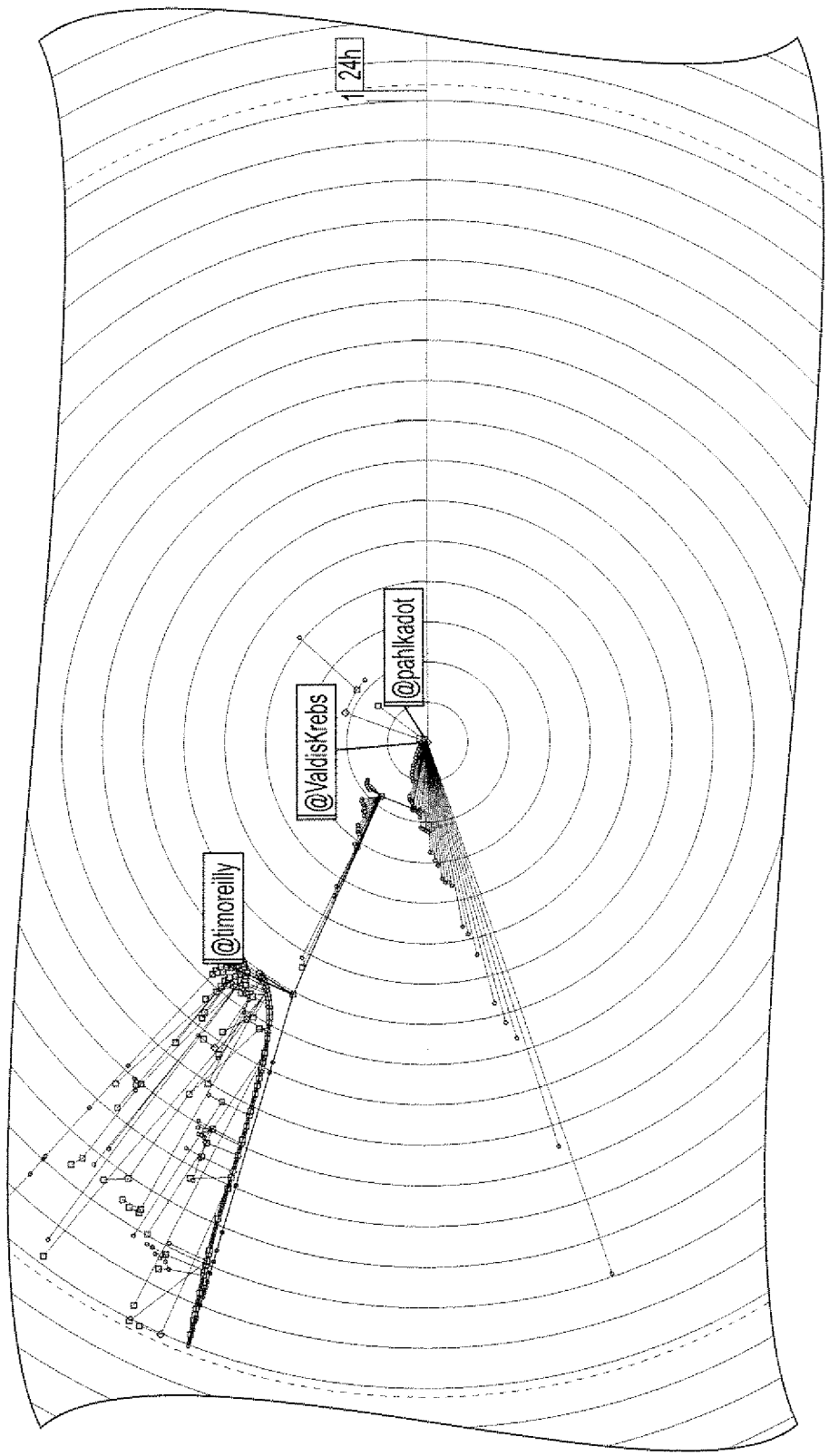
FIG. 9C illustrates an example content sharing visualization diagram in a top view depicting the further continuation of the building of a sharing event cascade structure according to an embodiment of the invention.

In one embodiment, FIGS. 9A-9C may illustrate a content sharing visualization diagram that is depicting the sharing event cascade structure illustrated in FIG. 8B. The content sharing visualization diagrams illustrated in FIGS. 9A-9C may depict the building of a sharing event cascade structure with reference to a time-axis from a top view. Accordingly, one or more nodes may be associated with data that indicates an activity that takes place at the beginning of the time-axis (e.g., browse activity, encode activity, sharing event activity, decode activity). As time increases, additional nodes may be generated that are associated with activity that takes place later in time.

FIGS. 10A-10F illustrate an example sharing visualization diagram depicting a transition from a network display to a time-based histogram according to an embodiment of the invention. The content sharing visualization diagrams illustrated in FIGS. 10A-10F may depict the building of a time-based histogram from a side view. The histogram may indicate the volume of sharing activity associated with one or more users.

Figure 10A:
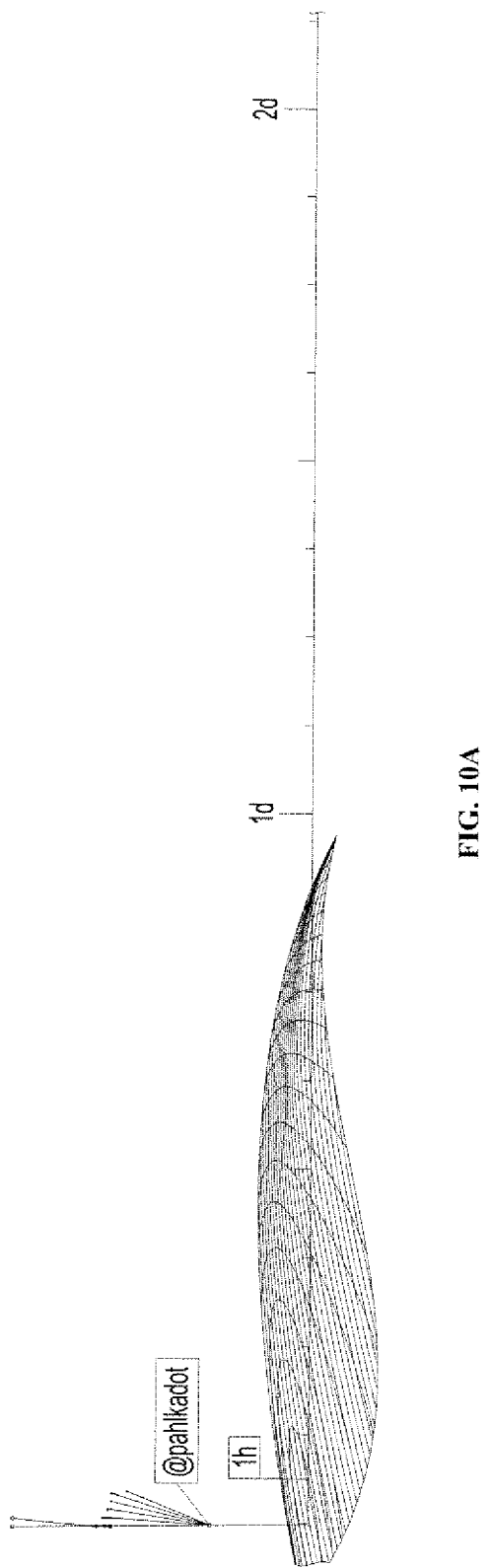
FIG. 10A illustrates an example sharing visualization diagram depicting a transition from a network display to a time-based histogram according to an embodiment of the invention.
Figure 10C:
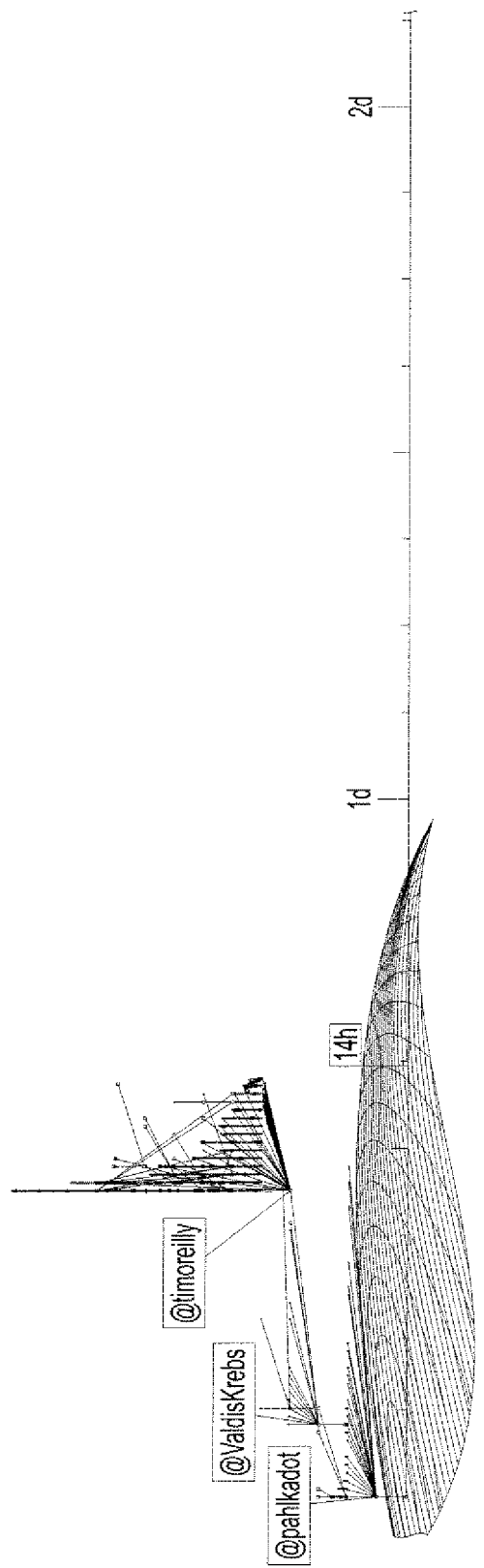
FIG. 10C illustrates an example sharing visualization diagram depicting the transition from a network display to a time-based histogram according to an embodiment of the invention.
Figure 10D:
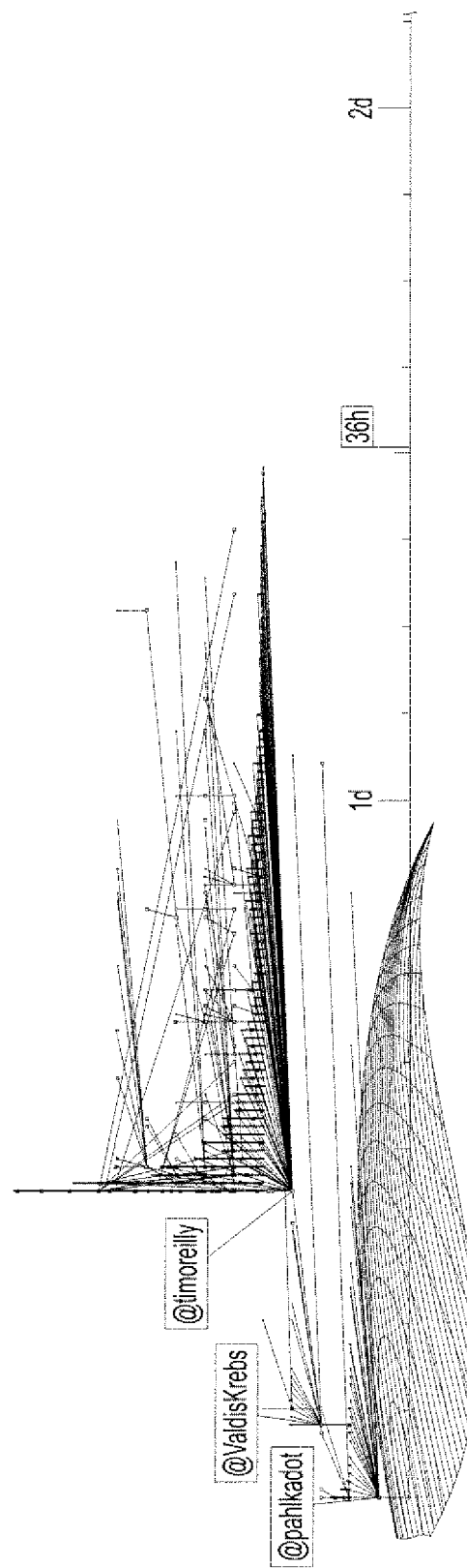
FIG. 10D illustrates an example sharing visualization diagram depicting the transition from a network display to a time-based histogram according to an embodiment of the invention.
Figure 10E:
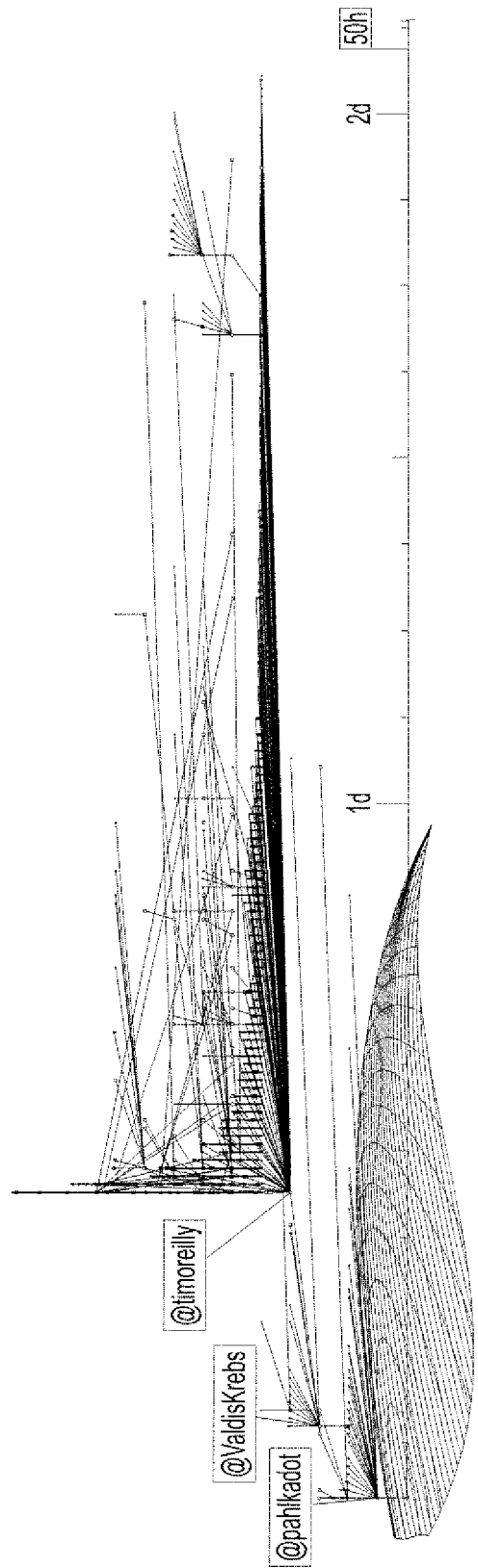
FIG. 10E illustrates an example sharing visualization diagram depicting the transition from a network display to a time-based histogram according to an embodiment of the invention.
Figure 10F:
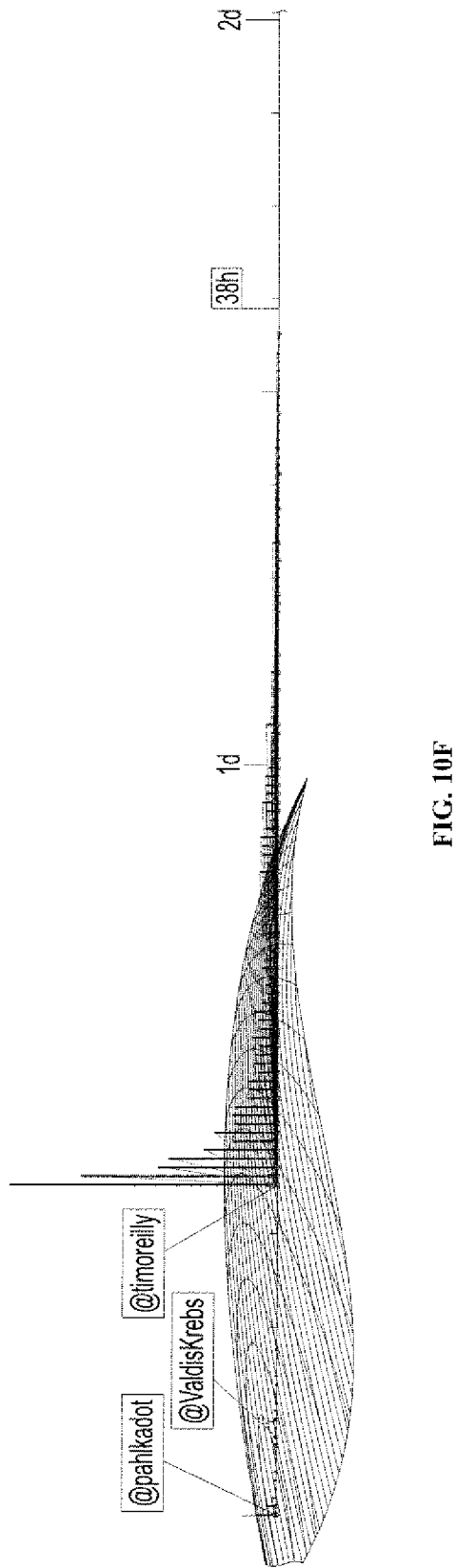
FIG. 10F illustrates an example sharing visualization diagram depicting the transition from a network display to a time-based histogram according to an embodiment of the invention.
Figure 11A:
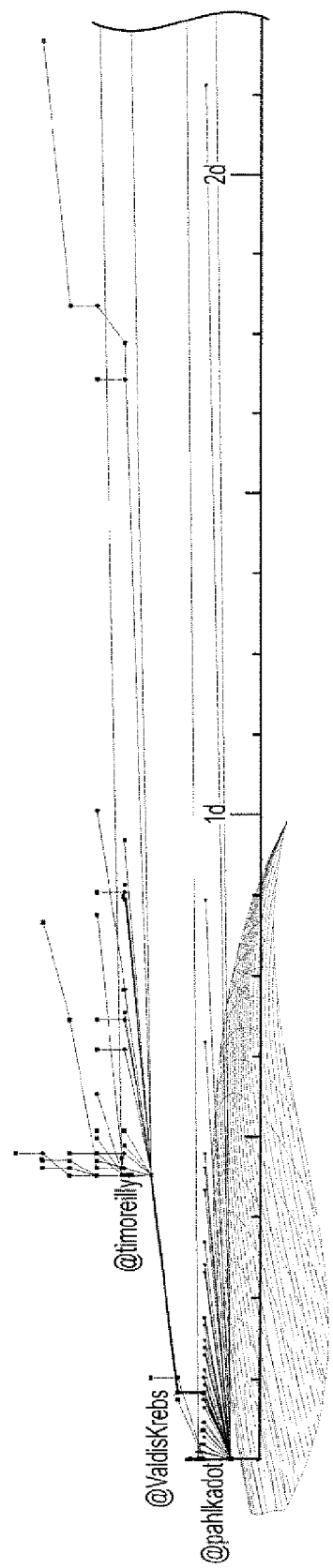
FIG. 11A illustrates an example sharing visualization diagram depicting the pruning of a sharing event cascade structure according to an embodiment of the invention.
Figure 11B:
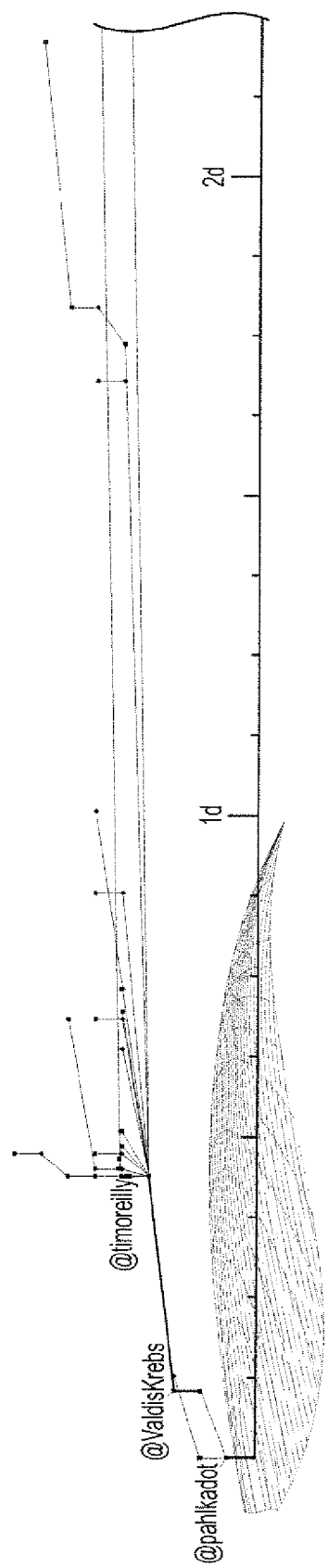
FIG. 11B illustrates an example sharing visualization diagram depicting the pruning of a sharing event cascade structure according to an embodiment of the invention.
Figure 11C:
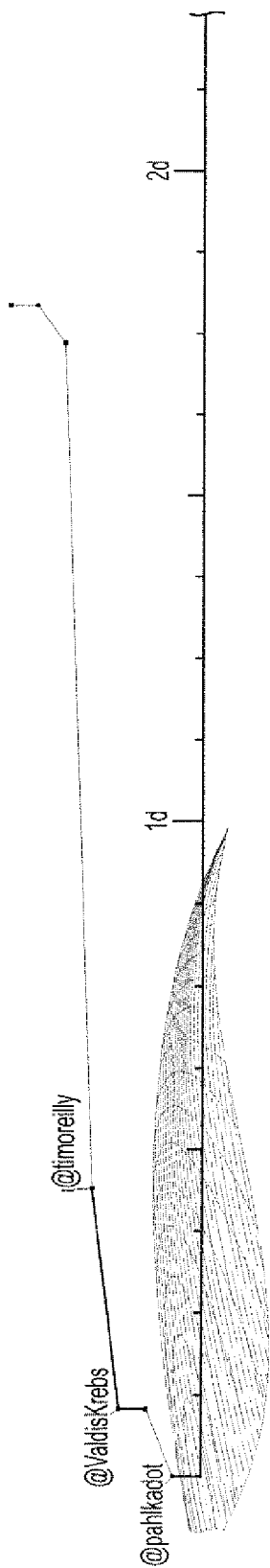
FIG. 11C illustrates an example sharing visualization diagram depicting the pruning of a sharing event cascade structure according to an embodiment of the invention.
Figure 11D:
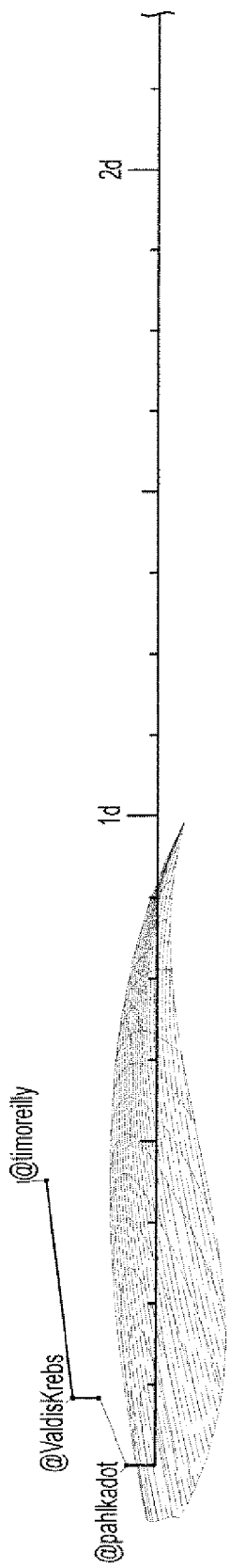
FIG. 11D illustrates an example sharing visualization diagram depicting the pruning of a sharing event cascade structure according to an embodiment of the invention.

FIGS. 11A-11D illustrate an example sharing visualization diagram depicting the pruning of a sharing event cascade structure according to an embodiment of the invention. As shown in FIGS. 10D-10E, sharing event cascade structures may become dense over time as a result of depicting multiple sharing event nodes. A pruning technique may be used to visually highlight significant moments in sharing event cascade structures.

In one embodiment, the pruning technique may include assigning one or more weights to each node in a sharing event cascade structure. The weights may be calculated as, any or a combination, of a ratio of the number of content sharing events associated with a node's sub-cascade (e.g., the events that build forward in time from a given node) to a total number of nodes in the sharing event cascade structure, a ratio of the number of content sharing events associated with a node's sub-cascade to the number of nodes between the node and the root node, a ratio of time-weighted sub-cascade sums which give more importance to nodes that generate long-acting and highly popular chains of events, and a ratio of forward decodes to backward content sharing events associated with the same indexed URL.

The pruning technique may continue by deleting one or more nodes that are associated with weights that do not meet a predetermined threshold and maintaining one or more nodes that are associated with weights that do meet the predetermined threshold. The sharing event analysis system 102 may store the weights calculated for each node. The weights may also be used to maintain a profile associated with a user that indicates the user's overall influence. Accordingly, users that are associated with high weight values may be considered very influential and users that are associated with low weight values may not be considered influential.

Figure 12A:
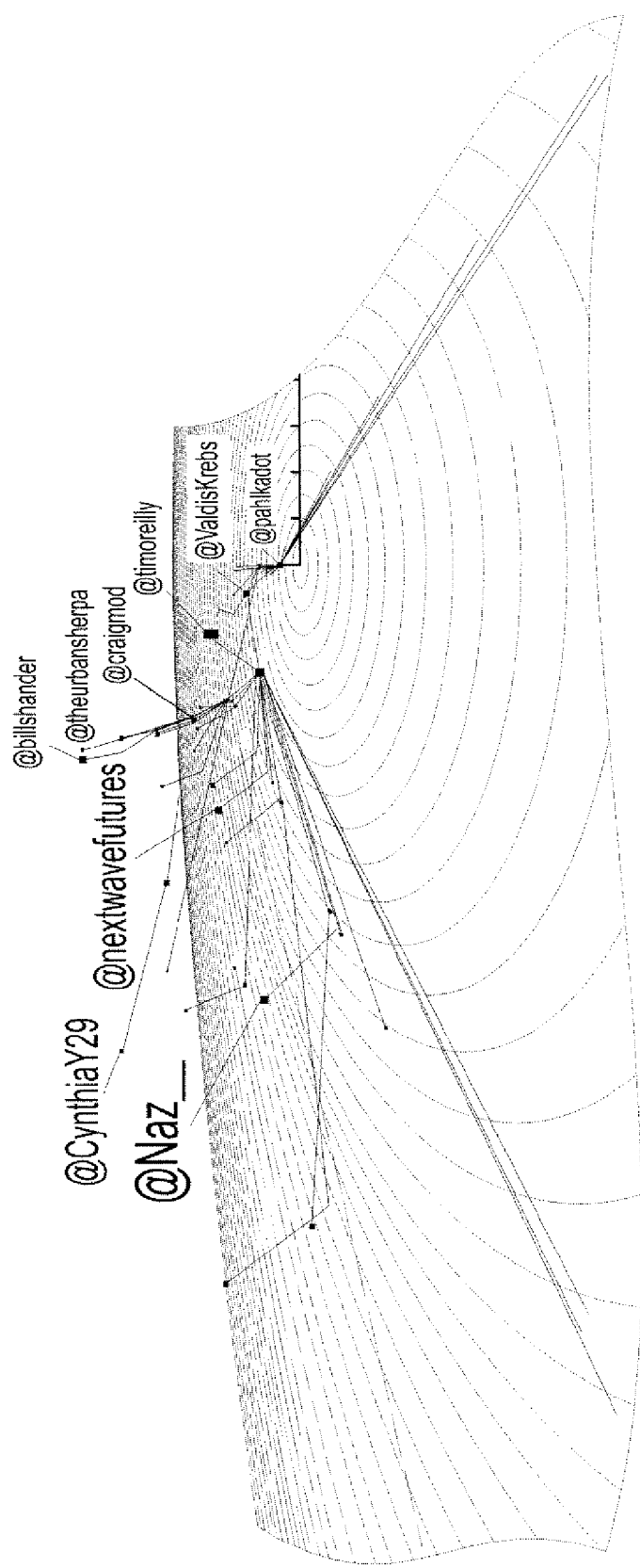
FIG. 12A illustrates an example sharing visualization diagram depicting the pruning of a sharing event cascade structure in a three-dimensional space according to an embodiment of the invention.
Figure 12B:
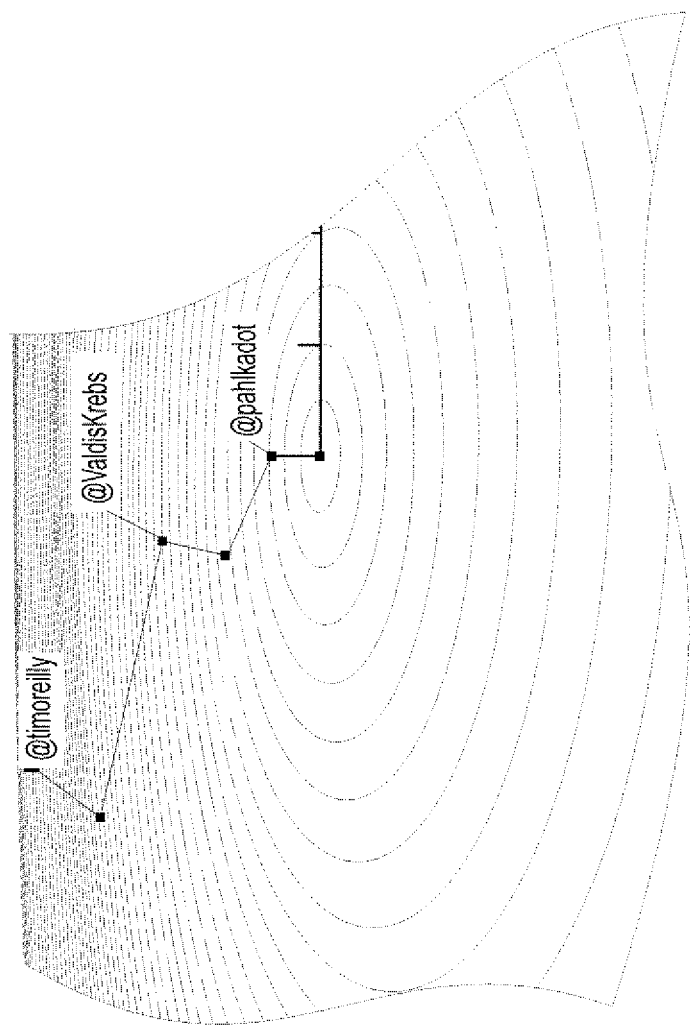
FIG. 12B illustrates an example sharing visualization diagram depicting the pruning of a sharing event cascade structure in a three-dimensional space according to an embodiment of the invention.

FIGS. 12A-12B illustrate an example sharing visualization diagram depicting the pruning of a sharing event cascade structure in a three-dimensional space according to an embodiment of the invention.

Figure 13A:
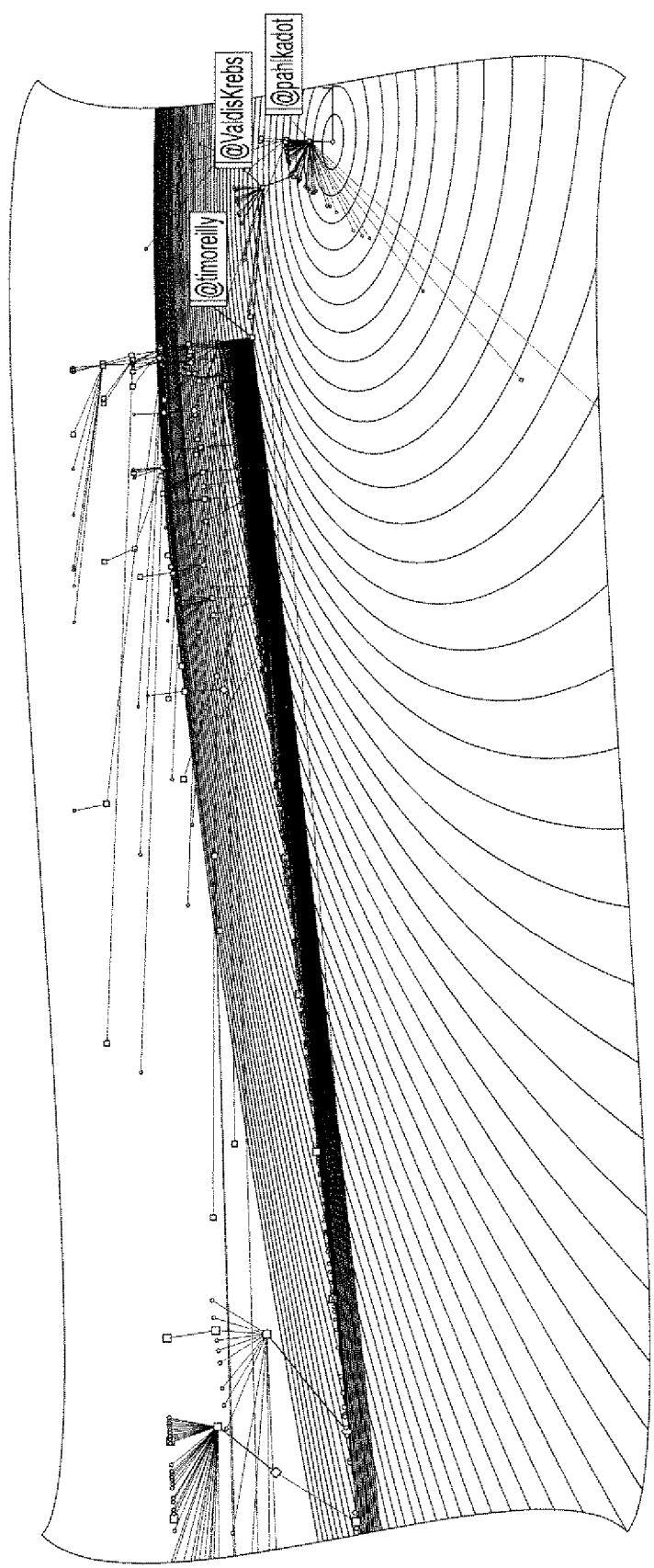
FIG. 13A illustrates an example content sharing visualization diagram depicting the examination of the text associated with a content sharing event according to an embodiment of the invention.
Figure 13B:
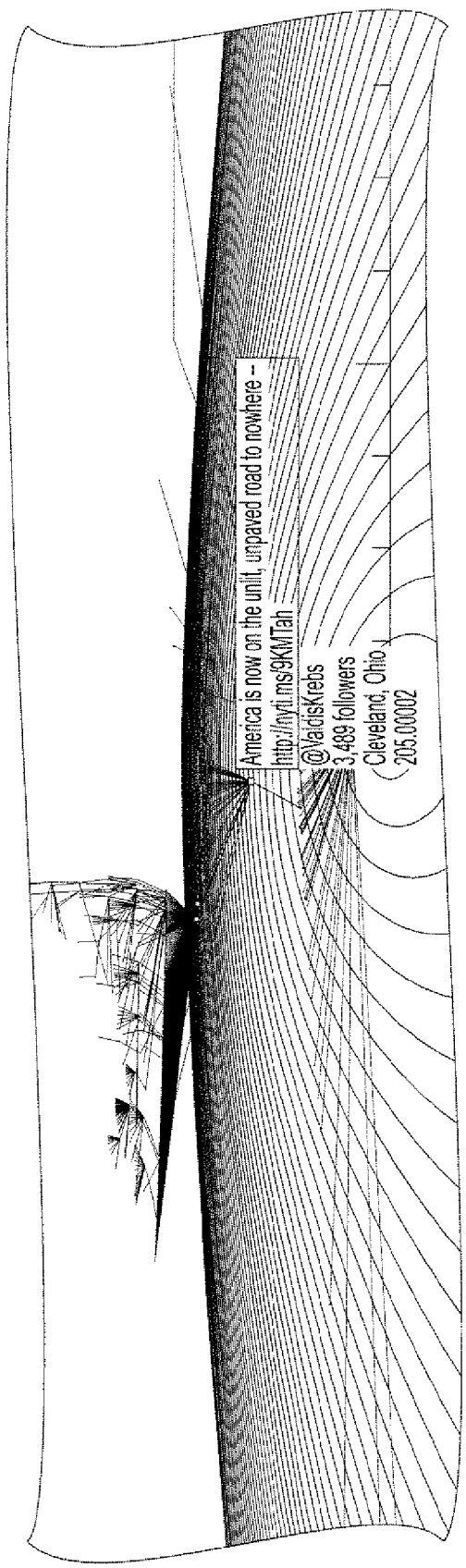
FIG. 13B illustrates an example content sharing visualization diagram depicting the examination of the text associated with a content sharing event according to an embodiment of the invention.
Figure 13C:
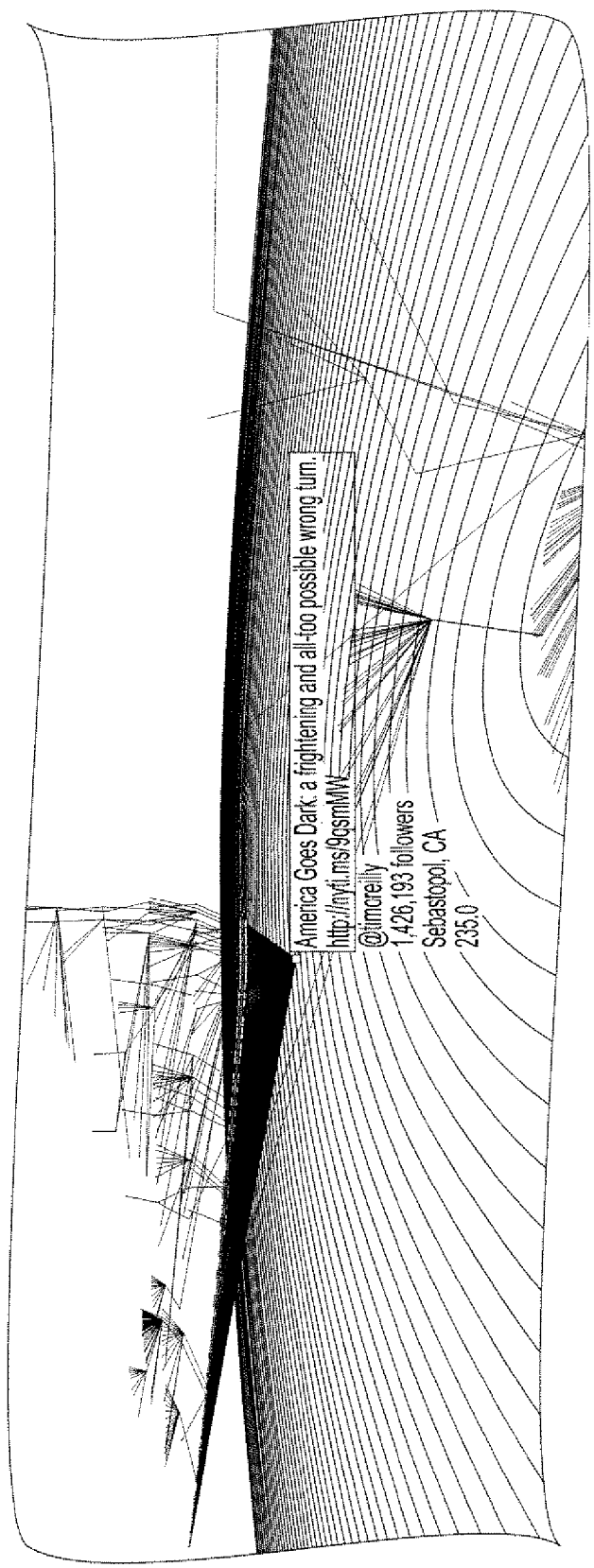
FIG. 13C illustrates an example content sharing visualization diagram depicting the examination of the text associated with a content sharing event according to an embodiment of the invention.

FIGS. 13A-13C illustrate an example content sharing visualization diagram depicting the examination of the text associated with a content sharing event according to an embodiment of the invention.

Figure 14A:
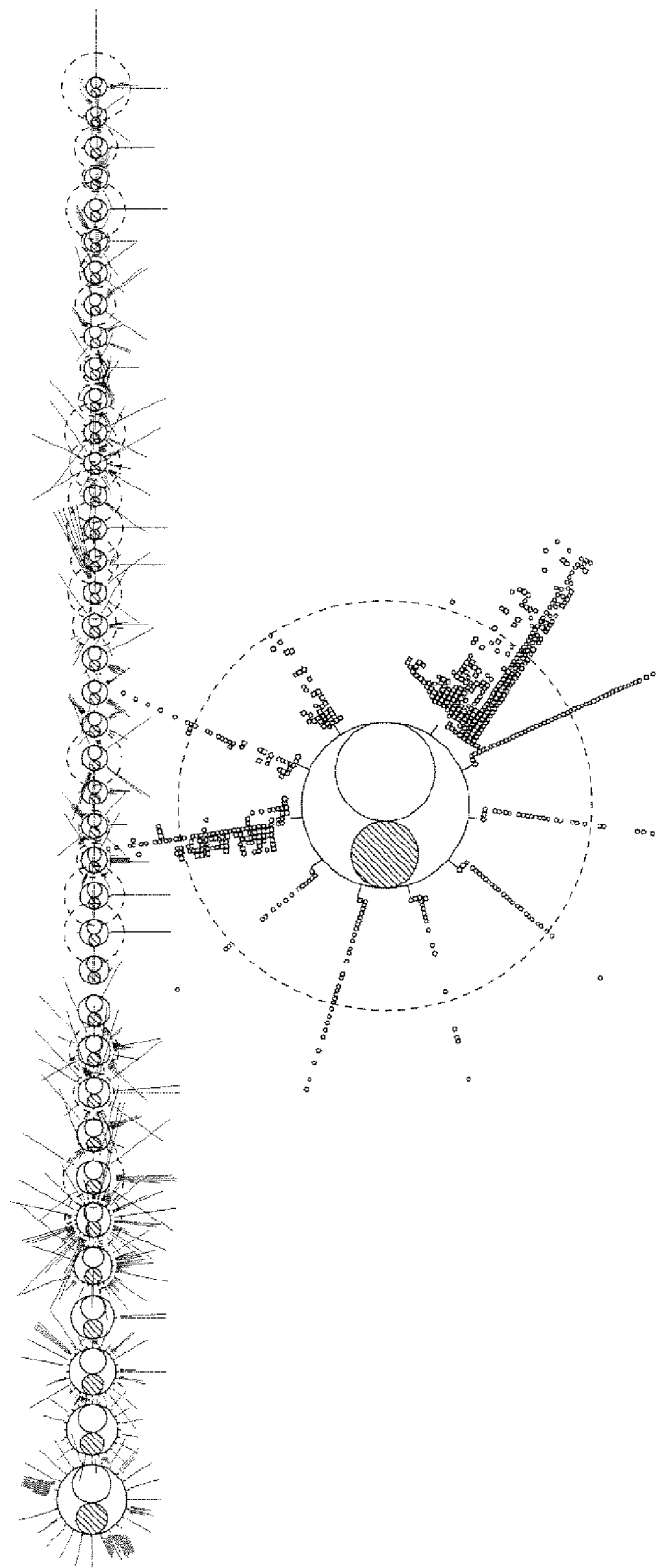
FIG. 14A illustrates an example content sharing visualization diagram depicting a representation of one or more sharing event cascade structures associated with a content item according to an embodiment of the invention.
Figure 14B:
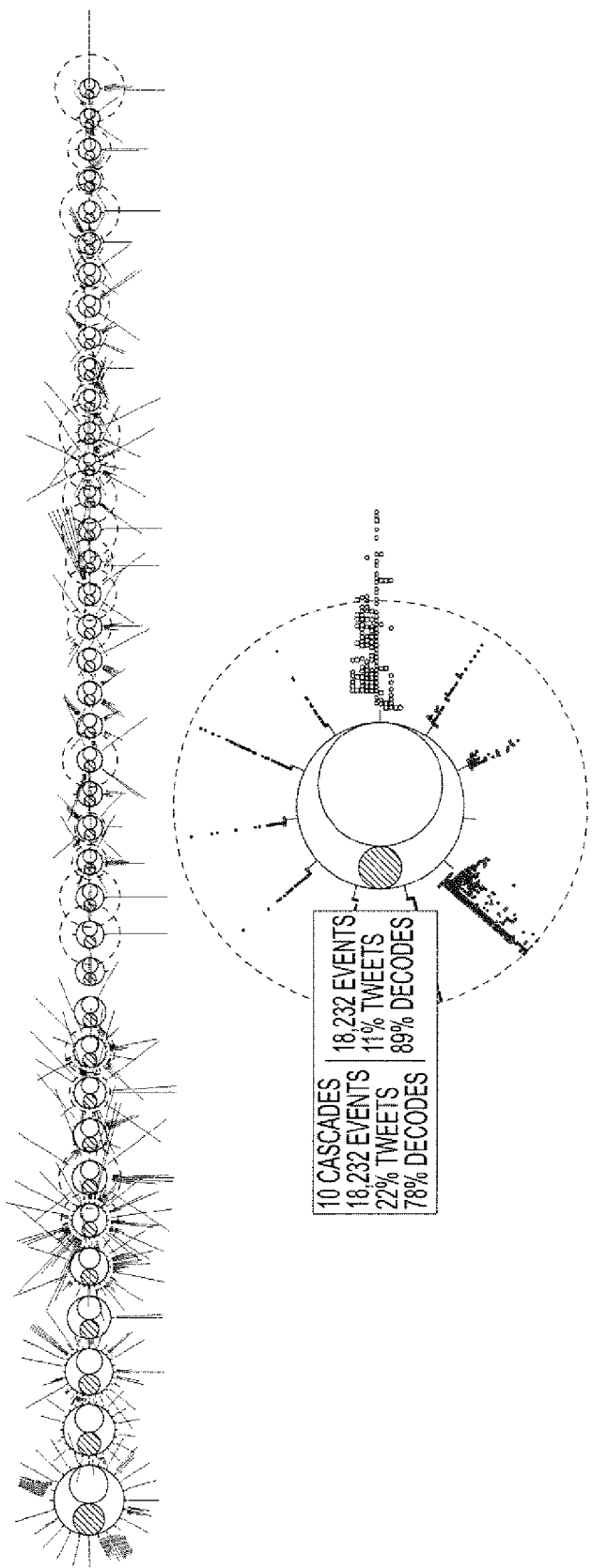
FIG. 14B illustrates an example content sharing visualization diagram depicting a representation of one or more sharing event cascade structures associated with a content item according to an embodiment of the invention.

FIGS. 14A-14B illustrate an example content sharing visualization diagram depicting a representation of one or more sharing event cascade structures associated with a content item according to an embodiment of the invention.

In one embodiment, a content sharing visualization diagram may illustrate one or more sharing event cascade structures in a cascade view such that the details associated with the building of the sharing event cascade structures are readily apparent. In another embodiment, a content sharing visualization diagram may illustrate one or more sharing event cascade structures in a story view such that the details associated with the result of the building of the sharing event cascade structures are readily apparent.

Figure 15:
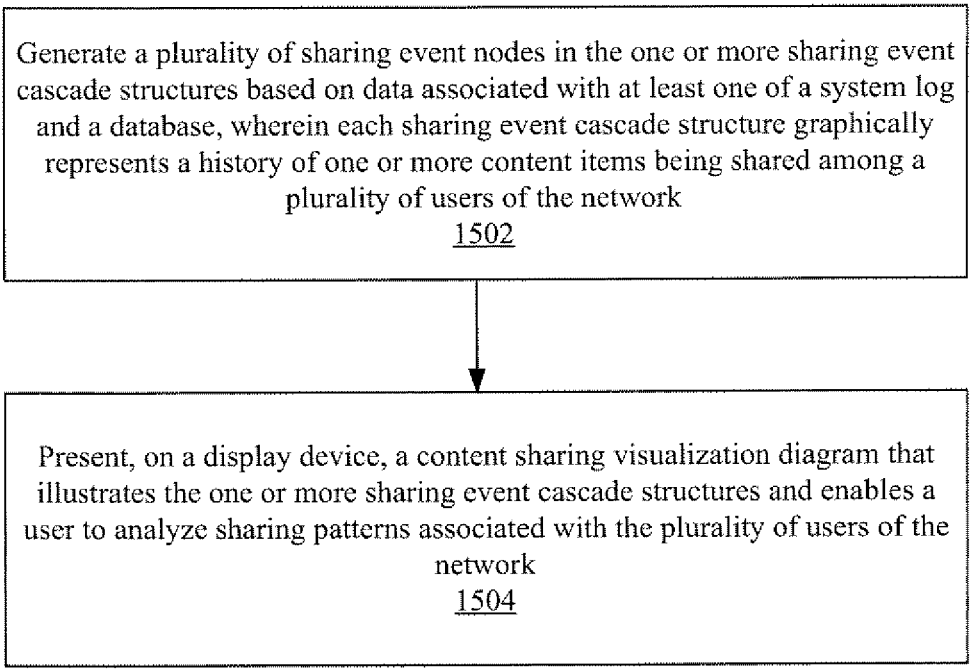
FIG. 15 is a flow chart illustrating a method of generating and visualizing sharing event cascade structures associated with content sharing events that occur across a network according to an embodiment of the invention.

FIG. 15 is a flow chart illustrating a method of generating and visualizing sharing event cascade structures associated with content sharing events that occur across a network according to an embodiment of the invention. This method is provided as an example; there are a variety of ways to carry out methods disclosed herein. The method 1500 shown in FIG. 15 can be executed or otherwise performed by one or a combination of various systems. The method 1500 is described below as carried out by the sharing event analysis system 102 shown in FIG. 1 by way of example, and various elements of the sharing event analysis system 102 are referenced in explaining the example method of FIG. 15. Each block shown in FIG. 30 represents one or more processes, methods, or subroutines carried in the method 1500. Referring to FIG. 15, the method 1500 may begin at block 1502.

In block 1502, the method 1500 may include generating a plurality of sharing event nodes in the one or more sharing event cascade structures based on data associated with at least one of a system log and a database, wherein each sharing event cascade structure graphically represents a history of one or more content items being shared among users of the network. In one embodiment, the sharing event cascade structure generation module 500 of the sharing event analysis system 102 may generate a plurality of sharing event nodes in the one or more sharing event cascade structures based on data associated with at least one of a system log and a database. The method 1500 may continue to block 1504.

In block 1504, the method 1500 may include presenting, on a display device, a content sharing visualization diagram that illustrates the one or more sharing event cascade structures and enables a user to analyze sharing patterns associated with the users of the network. In one embodiment, the output module 504 of the sharing event analysis system 102 may present, on a display device, a content sharing visualization diagram that illustrates the one or more sharing event cascade structures and enables a user to analyze sharing patterns associated with the users of the network. The method 1500 may then end.

The description above describes systems, networks, and reader devices, that may include one or more modules, some of which are explicitly shown in the figures. As used herein, the term "module" may be understood to refer to any, or a combination, of computer executable software, firmware, and hardware. It is noted that the modules are exemplary. The modules may be combined, integrated, separated, or duplicated to support various applications. Also, a function described herein as being performed at a particular module may be performed at one or more other modules or by one or more other devices instead of or in addition to the function performed at the particular module. Further, the modules may be implemented across multiple devices or other components local or remote to one another. Additionally, the modules may be moved from one device and added to another device, or may be included in multiple devices.

It is further noted that the software described herein is tangibly embodied in one or more physical media, such as, but not limited to any, or a combination, of a compact disc (CD), a digital versatile disc (DVD), a floppy disk, a hard drive, read only memory (ROM), random access memory (RAM), and other physical media capable of storing software. Moreover, the figures illustrate various components (e.g., systems, networks, and reader devices) separately. The functions described as being performed at various components may be performed at other components, and the various components may be combined or separated. Other modifications also may be made.

In the instant specification, various exemplary embodiments have been described with reference to the accompanying drawings. It will, however, be evident that various modifications or changes may be made thereto, or additional embodiments may be implemented, without departing from the broader scope of the invention as set forth in the claims that follow. The specification and drawings are accordingly to be regarded in an illustrative rather than a restrictive sense.

The invention claimed is:

1. A method of generating and visualizing a sharing event cascade structure associated with one or more content sharing events that occur across a network, the method comprising:
   determining that a communication device transmitted to a content server associated with a first hostname a content request for a content item, the content request comprising a unique resource identifier (RI) identifying the content item;
   generating, in response to determining that the communication device transmitted the request for the content item, a browsing event node in the sharing event cascade structure based on data associated with at least one of a system log and a database;
   determining that an RI encoding service generated an encoded version of the RI in response to an encoding request transmitted by said communication device to an encoding server associated with a second hostname that is different than the first hostname, the encoding request comprising the RI, the first hostname associated with the content server, and the second host name associated with the encoding server, and the encoding request being separate and distinct from the content request;
   in response to determining that the RI encoding service generated an encoded version of the RI in response to the encoding request, (i) generating an encoding node and (ii) linking the encoding node with the browsing node; and
   presenting, on a display device, a content sharing visualization diagram that illustrates the sharing event cascade structure.

2. The method of claim 1, wherein
   the RI is a first character string comprising a first string portion containing the first hostname and a second string portion appended to the first string portion comprising a content identifier for identifying the content item, and
   the encoded version of the RI is a second character string comprising a first string portion containing the second hostname but not the first hostname and a second string portion appended to the first string portion comprising an identifier mapped to the RI.

3. The method of claim 2, wherein
   determining that the RI encoding service generated an encoded version of the RI in response to an encoding request transmitted by said communication device comprises:
   determining an IP address of the communication device; and
   searching a database maintained by the encoding service for a record linking the determined IP address with the RI.

4. The method of claim 2, wherein determining the IP address of the communication device comprises searching a web server log for a log entry linking the RI or a portion of the RI with an IP address.

5. The method of claim 1, further comprising:
   determining that a content sharing service received from the communication device a content sharing request requesting the content sharing service to provide the encoded RI to a plurality of subscribers;
   in response to determining that the content sharing service received from the communication device the content sharing request, (i) generating a content sharing node and (ii) linking the content sharing node with one or more of the encoding node and the browsing node.

6. The method of claim 1, wherein the RI is a Uniform Resource Locator (URL).

7. The method of claim 1, wherein the one or more content sharing events comprise one or more virtual social links between two or more users.

8. The method of claim 1, wherein the content sharing visualization diagram is configured to be presented in a cascade view.

9. The method of claim 8, wherein the cascade view of the content sharing visualization diagram graphically represents a volume of content sharing events associated with each sharing event node.

10. The method of claim 1, wherein the content sharing visualization diagram is configured to be presented in a story view.

11. The method of claim 10, wherein the story view of the content sharing visualization diagram graphically presents sharing volume data associated with the sharing event cascade structure.

12. A system for generating and visualizing a sharing event cascade structure associated with one or more content sharing events that occur across a network, the system comprising a programmed computing apparatus programmed to:
   generate, in response to determining that a communication device transmitted to a content server associated with a first hostname a content request for a content item, a browsing event node in the sharing event cascade structure based on data associated with at least one of a system log and a database, wherein the request includes a resource identifier (RI) for identifying the content item;
   in response to determining that an RI encoding service generated an encoded version of the RI in response to an encoding request transmitted by the communication device to an encoding server associated with a second hostname that is different than the first hostname, (i) generating an encoding node and (ii) linking the encoding node with the browsing node, wherein the encoding request is separate and distinct from the content request; and
   present, on a display device, a content sharing visualization diagram that illustrates the sharing event cascade structure.

13. The system of claim 12, further comprising a programmed computing apparatus configured to calculate cascade statistics for each of a plurality of users associated with the content sharing events.

14. The system of claim 13, wherein the cascade statistics are calculated based on sharing patterns associated with at least one of the plurality of users.

15. The system of claim 13, wherein the cascade statistics are calculated based on a type of content item being shared.

16. The system of claim 12, wherein the programmed computing apparatus is further configured to: (i) generate a content sharing node and (ii) link the content sharing node with one or more of the encoding node and the browsing node in response to determining that a content sharing service received from the communication device a content sharing request comprising the resource identifier.

17. The system of claim 12, wherein the RI is a Uniform Resource Locator (URL).

18. The system of claim 12, wherein the one or more content sharing events comprise one or more virtual social links between two or more users.

19. The system of claim 12, wherein the content sharing visualization diagram is configured to be presented in a cascade view.

20. The system of claim 19, wherein
   the RI is a first character string comprising a first string portion containing the first hostname and a second string portion appended to the first string portion comprising a content identifier for identifying the content item, and
   the encoded version of the RI is a second character string comprising a first string portion containing the second hostname but not the first hostname and a second string portion appended to the first string portion comprising an identifier mapped to the RI.

21. The system of claim 12, wherein the programmed computing apparatus is further programmed to determine that the RI encoding service generated an encoded version of the RI in response to the encoding request transmitted by said communication device by determining an IP address of the communication device; and searching a database maintained by the encoding service for a record linking the determined IP address with the RI.

22. The system of claim 21, wherein the programmed computing apparatus is further programmed to determine that the RI encoding service generated an encoded version of the RI in response to the encoding request transmitted by said communication device by determining an IP address of the communication device; and searching a database maintained by the encoding service for a record linking the determined IP address with the RI.

* * * * *